US011862857B2

(12) United States Patent
Aviv et al.

(10) Patent No.: US 11,862,857 B2
(45) Date of Patent: Jan. 2, 2024

(54) MULTI-BAND ANTENNA SYSTEM

(71) Applicant: QUALCOMM Incorporated, San Diego, CA (US)

(72) Inventors: Assaf Aviv, Petch-Tikwa (IL); Elimelech Ganchrow, Zichron Yaakov (IL); Robert Gilmore, Poway, CA (US); Ernest Ozaki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/009,845

(22) Filed: Sep. 2, 2020

(65) Prior Publication Data

US 2021/0098891 A1 Apr. 1, 2021

Related U.S. Application Data

(60) Provisional application No. 62/908,205, filed on Sep. 30, 2019.

(51) Int. Cl.
*H01Q 21/06* (2006.01)
*H01Q 21/28* (2006.01)
(Continued)

(52) U.S. Cl.
CPC ............... *H01Q 21/24* (2013.01); *H01Q 5/48* (2015.01); *H01Q 9/0414* (2013.01);
(Continued)

(58) Field of Classification Search
CPC ........ H01Q 21/24; H01Q 5/48; H01Q 9/0414; H01Q 9/065; H01Q 9/16; H01Q 21/065;
(Continued)

(56) References Cited

U.S. PATENT DOCUMENTS

| | | | |
|---|---|---|---|
| 4,684,953 | A | 8/1987 | Hall |
| 5,003,318 | A | 3/1991 | Berneking et al. |

(Continued)

FOREIGN PATENT DOCUMENTS

| | | | |
|---|---|---|---|
| KR | 20100066279 | A | 6/2010 |
| WO | 2018169239 | A1 | 9/2018 |
| WO | 2019152429 | A1 | 8/2019 |

OTHER PUBLICATIONS

International Search Report and Written Opinion—PCT/US2020/053285—ISA/EPO—dated Jan. 26, 2021.

*Primary Examiner* — Hai V Tran
*Assistant Examiner* — Michael M Bouizza
(74) *Attorney, Agent, or Firm* — SUNSTEIN LLP/Qualcomm Incorporated

(57) ABSTRACT

An antenna system includes: a first patch antenna element that is electrically conductive; a first energy coupler configured to convey first energy to, or receive the first energy from, the first patch antenna element, the first energy being in a first frequency band; a second patch antenna element at least partially overlapping the first patch antenna element, the second patch antenna element comprising a plurality of physically separate portions that are each electrically conductive; and a second energy coupler connected to a first subset of the plurality of physically separate portions, the first subset comprising less than all of the plurality of physically separate portions, the second energy coupler configured to convey second energy to, or receive the second
(Continued)

energy from, the first subset, the second energy being in a second frequency band that is higher than the first frequency band.

26 Claims, 15 Drawing Sheets

(51) Int. Cl.

| | |
|---|---|
| ***H01Q 9/04*** | (2006.01) |
| ***H01Q 9/06*** | (2006.01) |
| ***H01Q 21/24*** | (2006.01) |
| ***H01Q 5/48*** | (2015.01) |
| ***H01Q 9/16*** | (2006.01) |

(52) U.S. Cl.
CPC ............... *H01Q 9/065* (2013.01); *H01Q 9/16* (2013.01); *H01Q 21/065* (2013.01); *H01Q 21/28* (2013.01)

(58) Field of Classification Search
CPC .......... H01Q 21/28; H01Q 1/38; H01Q 5/378; H01Q 5/40; H01Q 9/0407; H01Q 21/062; H01Q 1/243; H01Q 5/385; H01Q 5/28
See application file for complete search history.

(56) References Cited

U.S. PATENT DOCUMENTS

| | | | | |
|---|---|---|---|---|
| 6,054,953 | A | 4/2000 | Lindmark | |
| 6,593,891 | B2 | 7/2003 | Zhang | |
| 9,172,132 | B2 | 10/2015 | Kam et al. | |
| 9,520,655 | B2 | 12/2016 | Cerreno | |
| 9,609,530 | B2 | 3/2017 | Lea et al. | |
| 10,135,138 | B2 | 11/2018 | Puente et al. | |
| 10,916,853 | B2 | 2/2021 | Rogers | |
| 11,233,310 | B2 | 1/2022 | Rogers et al. | |
| 2010/0097274 | A1 | 4/2010 | Rao et al. | |
| 2011/0001682 | A1 | 1/2011 | Rao | |
| 2011/0279344 | A1 | 11/2011 | He et al. | |
| 2015/0263431 | A1 | 9/2015 | Moon et al. | |
| 2016/0285173 | A1* | 9/2016 | Svendsen ............... | H01Q 5/385 |
| 2018/0198212 | A1* | 7/2018 | Rodríguez ............... | H01Q 9/16 |
| 2018/0323509 | A1 | 11/2018 | Ogawa | |
| 2019/0165476 | A1 | 5/2019 | Hong et al. | |
| 2019/0221935 | A1 | 7/2019 | Chen | |
| 2020/0106183 | A1 | 4/2020 | Fabrega Sanchez et al. | |
| 2020/0127387 | A1* | 4/2020 | Park ..................... | H01Q 9/0414 |
| 2020/0403322 | A1* | 12/2020 | Ryu ....................... | H01Q 21/08 |
| 2021/0098894 | A1 | 4/2021 | Haviv et al. | |

* cited by examiner

MULTI-BAND ANTENNA SYSTEM

CROSS-REFERENCE TO RELATED APPLICATION

This application claims the benefit of U.S. Provisional Application No. 62/908,205, filed Sep. 30, 2019, entitled "MULTI-BAND, SHARED-COMPONENT ANTENNA SYSTEM," assigned to the assignee hereof, and the entire contents of which are hereby incorporated herein by reference.

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support communication over a range of frequencies.

It is often desirable to have multiple communication technologies, e.g., to enable multiple communication protocols concurrently, and/or to provide different communication capabilities. For example, as wireless communication technology evolves from 4G to 5G or to different wireless local area network (WLAN) standards, for example, mobile communication devices may be configured to communicate using different frequencies, including frequencies below 6 GHz often used for 4G or 5G and some WLAN communications, and millimeter-wave frequencies, e.g., above 23 GHz, for 5G and some WLAN communications. Communicating using different frequencies, however, may be difficult, especially using mobile wireless communication devices with small form factors.

SUMMARY

An example of an antenna system includes: a first patch antenna element that is electrically conductive; a first energy coupler configured to convey first energy to, or receive the first energy from, the first patch antenna element, the first energy being in a first frequency band; a second patch antenna element at least partially overlapping the first patch antenna element, the second patch antenna element including a plurality of physically separate portions that are each electrically conductive; and a second energy coupler connected to a first subset of the plurality of physically separate portions, the first subset including less than all of the plurality of physically separate portions, the second energy coupler configured to convey second energy to, or receive the second energy from, the first subset, the second energy being in a second frequency band that is higher than the first frequency band.

Implementations of such an antenna system may include one or more of the following features. The second energy coupler is connected to the first subset to operate the first subset as a first dipole, and wherein the first dipole includes a first plurality of conductive patches. The first patch antenna element has a first perimeter with a first perimeter shape, and the second patch antenna element has a second perimeter bounding the second patch antenna element, the second perimeter having a second perimeter shape similar to the first perimeter shape. The first perimeter is substantially square, the second perimeter is substantially square, and each of the plurality of physically separate portions is substantially square, and wherein a first side of the first patch antenna element has a first side length that is about a half of wavelength in a substrate of the antenna system at a first frequency in the first frequency band and a second side of each of the plurality of physically separate portions has a second side length that is at least about a half of a wavelength in the substrate of the antenna system at a second frequency in the second frequency band. Each of the plurality of physically separate portions is disposed in a respective quadrant within the second perimeter, the first subset including two of the plurality of physically separate portions disposed in diagonally disposed quadrants. The first side length is about twice the second side length of each of the plurality of physically separate portions, and the second side length is about a half of the wavelength at the second frequency.

Also or alternatively, implementations of such an antenna system may include one or more of the following features. The antenna system includes a third energy coupler either: coupled to the first patch antenna element to operate the first patch antenna element, in conjunction with the first energy coupler, as an orthogonally-polarized patch antenna element; or connected only to a second subset of the plurality of physically separate portions of the second patch antenna element to convey the second energy to, or receive the second energy from, the second subset, the second subset being distinct from the first subset. The third energy coupler is coupled to the second subset, the first subset including two kitty-corner portions of the plurality of physically separate portions of the second patch antenna element, and the second subset including two other kitty-corner portions of the plurality of physically separate portions of the second patch antenna element. The first patch antenna element defines an opening through which the second energy coupler passes, the second energy coupler being displaced from the first patch antenna element. The opening is symmetric about a center of the first patch antenna element. The first patch antenna element and the second patch antenna element include a first cell, and the antenna system includes a second cell configured similarly to the first cell and displaced from the first cell, parallel to a plane of the first patch antenna element, about one half of a free-space wavelength of a frequency of the first energy.

Also or alternatively, implementations of such an antenna system may include one or more of the following features. The antenna system includes at least one first tuner disposed between the first patch antenna element and the second patch antenna element. The at least one first tuner includes a plurality of conductive strips coupled to the second energy coupler. The plurality of conductive strips are disposed in different layers of the antenna system. The antenna system includes a plurality of second tuners each coupled to a respective one of the first energy coupler and the second energy coupler. Each of the plurality of second tuners includes a conductive stub. A combination of the first patch antenna element, the second patch antenna element, the first energy coupler, and the second energy coupler includes a first array cell, the antenna system including an array including a plurality of the first array cells and a plurality of second array cells, each of the plurality of second array cells being configured to operate in the second frequency band, the plurality of the first array cells being interlaced with the plurality of second array cells in the array.

An example of a method of operating an antenna system includes: operating a first patch antenna element to send or receive first energy having a first frequency; operating a second patch antenna element as a parasitic patch to the first patch antenna element; and operating a first portion of the second patch antenna element as a first dipole antenna to send or receive second energy having a second frequency.

Implementations of such a method may include one or more of the following features. The method includes operating a second portion of the second patch antenna element as a second dipole antenna to send or receive third energy having the second frequency. Operating the first dipole antenna and operating the second dipole antenna include radiating the second energy and the third energy from the first dipole antenna and the second dipole antenna, respectively, with orthogonal polarizations. The second patch antenna element is substantially square and includes four physically separate, substantially square, conductive patches, and wherein operating the first dipole antenna includes feeding the second energy to a first pair of the conductive patches disposed in a first pair of diagonally disposed quadrants of the second patch antenna element and operating the second dipole antenna includes feeding the third energy to a second pair of the conductive patches disposed in a second pair of diagonally disposed quadrants of the second patch antenna element, the second pair of diagonally disposed quadrants being distinct from the first pair of diagonally disposed quadrants. Operating the first dipole antenna and operating the second dipole antenna includes differentially feeding the first and second dipole antennas relative to each other. Differentially feeding the first and second dipole antennas includes feeding the first and second dipole antennas through an opening defined in the first patch antenna element with first and second pairs, respectively, of unshielded conductive lines. The second frequency is about twice the first frequency.

An example of a multi-band antenna system includes: first means for radiating and/or receiving first energy in a first frequency band, the first means including parasitic means for parasitically radiating and/or receiving at least a portion of the first energy; and second means for radiating and/or receiving second energy in a second frequency band using a first subset of pieces of the parasitic means.

Implementations of such an antenna system may include third means for radiating and/or receiving third energy in the second frequency band using a second subset of pieces of the parasitic means, the second subset of pieces of the parasitic means being distinct from the first subset of pieces of the parasitic means.

Another example of an antenna system includes: a patch antenna element that is electrically conductive and substantially planar, the patch antenna element formed so as to define an opening therein; a first energy coupler configured to convey first energy to, or receive the first energy from, the patch antenna element, the first energy being in a first frequency band; a dipole antenna including one or more portions that are electrically conductive and substantially planar, the dipole antenna at least partially overlapping the patch antenna element; and a second energy coupler configured to convey second energy to, or receive the second energy from, the dipole antenna, the second energy coupler being separate from the first energy coupled and at least a portion of the second energy coupler passing through the opening in the patch antenna, the second energy being in a second frequency band that is higher than the first frequency band.

Implementations of such an antenna system may include one or more of the following features. The dipole antenna includes a subset of a plurality of electrically conductive plates, the plurality of electrically conductive plates forming a parasitic patch in a stacked configuration with the patch antenna element. The dipole antenna is defined by one or more slots formed in a conductive plate. The dipole antenna includes a plurality of conductive strips surrounded by a parasitic patch, the parasitic patch being coplanar with the plurality of conductive strips.

Another example of an antenna system includes: a first patch antenna element that is electrically conductive; a first energy coupler configured to convey first energy to or from the first patch antenna element; a second patch antenna element at least partially overlapping the first patch antenna element, the second patch antenna element defining a first slot through the second patch antenna element; and a second energy coupler configured to convey second energy to, or receive the second energy from, the first slot or a first dipole at least partially overlapping the first slot.

Implementations of such an antenna system may include one or more of the following features. The antenna system includes the first dipole, the first dipole being disposed in the first slot. The first patch antenna element is rectangular and has a side length of about twice a length of the first dipole. The second patch antenna element further defines a second slot substantially orthogonal to and intersecting the first slot. The first slot and the second slot intersect each other at a first midpoint of the first slot and a second midpoint of the second slot. The second patch antenna element is rectangular and the first midpoint of the first slot and the second midpoint of the second slot are disposed at a center of the second patch antenna element. The second energy coupler is configured to convey the second energy to, or receive the second energy from, the first slot and the second slot. The second energy coupler includes a first conductive strip disposed substantially orthogonally to the first slot and a second conductive strip disposed substantially orthogonally to the second slot, the first conductive strip and the second conductive strip being disposed between the first patch antenna element and the second patch antenna element. The antenna system includes the first dipole and a second dipole, the first dipole being disposed in the first slot and the second dipole being disposed in the second slot.

Also or alternatively, implementations of such an antenna system may include one or more of the following features. The second energy coupler is configured to convey the second energy to the first slot, and the first patch antenna element is rectangular and has a side length of about twice a length of the first slot. The first patch antenna element defines an opening through the first patch antenna element and a conductor of the second energy coupler extends through the opening. The opening is centered about a center of the first patch antenna element. A combination of the first patch antenna element, the second patch antenna element, the first energy coupler, and the second energy coupler includes a first array component, and the antenna system includes an array including a plurality of the first array components and a plurality of second array components, each of the second array components including the second patch antenna element and the second energy coupler, the plurality of first array components being interlaced with the plurality of second array components in the array.

Another example method of operating an antenna system includes: operating a first patch antenna element to send or receive first energy having a first frequency; operating a second patch antenna element as a parasitic patch to the first patch antenna element; and operating either: a first dipole disposed in a first slot defined by the second patch antenna element to send or receive second energy having a second frequency; or the first slot to send or receive the second energy having the second frequency.

Implementations of such a method may include one or more of the following features. The first dipole is disposed in the first slot and operated to send or receive the second energy, and the method includes operating a second dipole disposed in a second slot defined by the second patch antenna element such that the first dipole and the second dipole are orthogonally polarized. The method includes operating the first slot to send or receive the second energy, and the method includes operating a second slot defined by the second patch antenna element such that the first slot and the second slot are orthogonally polarized. The second frequency is about twice the first frequency.

An example of a multi-band antenna system includes: first means for radiating and/or receiving first energy in a first frequency band, the first means including parasitic means for parasitically radiating and/or receiving at least a portion of the first energy; and second means for radiating and/or receiving second energy in a second frequency band using a slot in the parasitic means or means for conducting disposed in the slot.

Implementations of such an antenna system may include one or more of the following features. The first frequency band is lower than the second frequency band, and the first frequency band and the second frequency band do not overlap. The first means include means for radiating in a first polarization and a second polarization, and the second means include means for radiating in the first polarization and the second polarization.

DETAILED DESCRIPTION

Techniques are discussed herein for multi-band antenna system operation. For example, stacked patches may be used for operation in one frequency band, e.g., a lower frequency band, with the stacked patches including an active patch and a parasitic patch. The active patch is coupled to an energy coupler, for example, so that the active patch may be driven or so that energy received by the active patch may be conveyed to the energy coupler for provision to circuitry for processing the energy (e.g., communication signals, positioning signals, etc.). At least a portion of the parasitic patch may be used for operation in another frequency band, e.g., a higher frequency band. Thus, at least a portion of the parasitic patch is shared for operation in more than one frequency band. For example, the shared patch may include multiple, physically separate pieces at least some of which are used as an active component for the other frequency. The physically separate pieces may be used, for example, as one or more dipoles. As another example, the shared patch (that is a parasitic patch for one frequency band), may provide one or more slots for operation in the other frequency band. As yet another example, the shared patch may provide one or more slots and one or more dipoles may overlap (e.g., being disposed in) the one or more slots and be used for operation in the other frequency band. Each of the different frequency bands may extend over a large range of frequencies (e.g., for a range over 15% (e.g., over about 60%) of the lowest frequency in the band), and the different frequency bands may be separated by a range of frequencies. For example, a highest frequency of one band being 10 GHz or more less than a lowest frequency of the other band. As another example, the highest frequency of one band may be about 90% of the lowest frequency of the other band. Other configurations, however, may be used.

Items and/or techniques described herein may provide one or more of the following capabilities, as well as other capabilities not mentioned. For example, multi-band antenna operation may be provided using co-located antenna components. At least a portion of an antenna system may be used for radiation or receipt of wireless signals of one frequency band and also used for radiation or receipt of wireless signals of a different frequency band. Broadband, multi-band antenna operation may be provided in a compact form factor, e.g., with high gain, a low profile, and/or low manufacturing cost. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
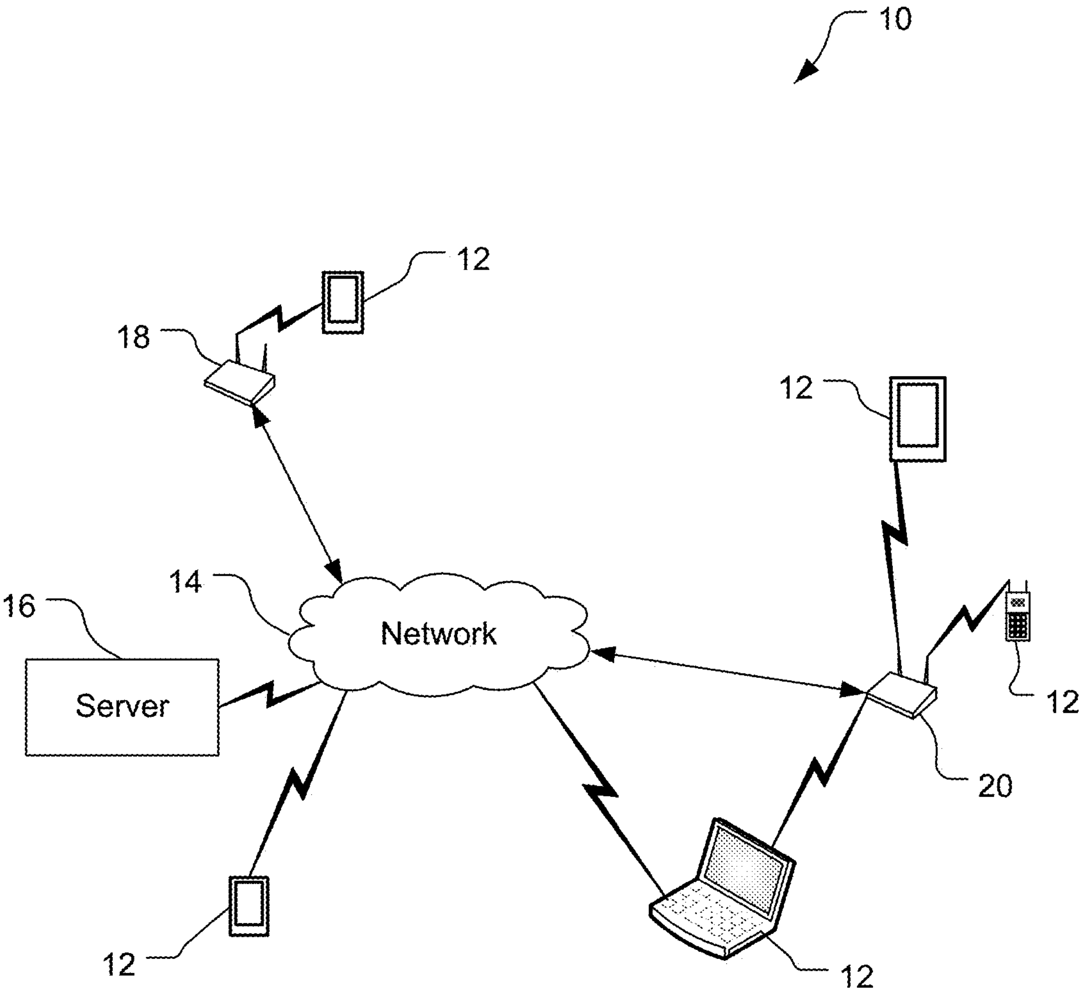
FIG. 1 is a schematic diagram of a communication system.

Referring to FIG. 1, a communication system 10 includes mobile devices 12, a network 14, a server 16, and access points (APs) 18, 20. The system 10 is a wireless communication system in that components of the system 10 can communicate with one another (at least some times using wireless connections) directly or indirectly, e.g., via the network 14 and/or one or more of the access points 18, 20 (and/or one or more other devices not shown, such as one or more base transceiver stations). For indirect communications, the communications may be altered during transmission from one entity to another, e.g., to alter header information of data packets, to change format, etc. The mobile devices 12 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the system 10 and may communicate with each other and/or with the mobile devices 12, network 14, server 16, and/or APs 18, 20. For example, such other devices may include internet of thing (IoT) devices, medical devices, home entertainment and/or automation devices, etc. The mobile devices 12 or other devices may be configured to communicate in different networks and/or for different purposes (e.g., 5G, Wi-Fi communication, multiple frequencies of Wi-Fi communication, satellite positioning, one or more types of cellular communications (e.g., GSM (Global System for Mobiles), CDMA (Code Division Multiple Access), LTE (Long-Term Evolution), etc.), Bluetooth® communication, etc.).

Figure 2:
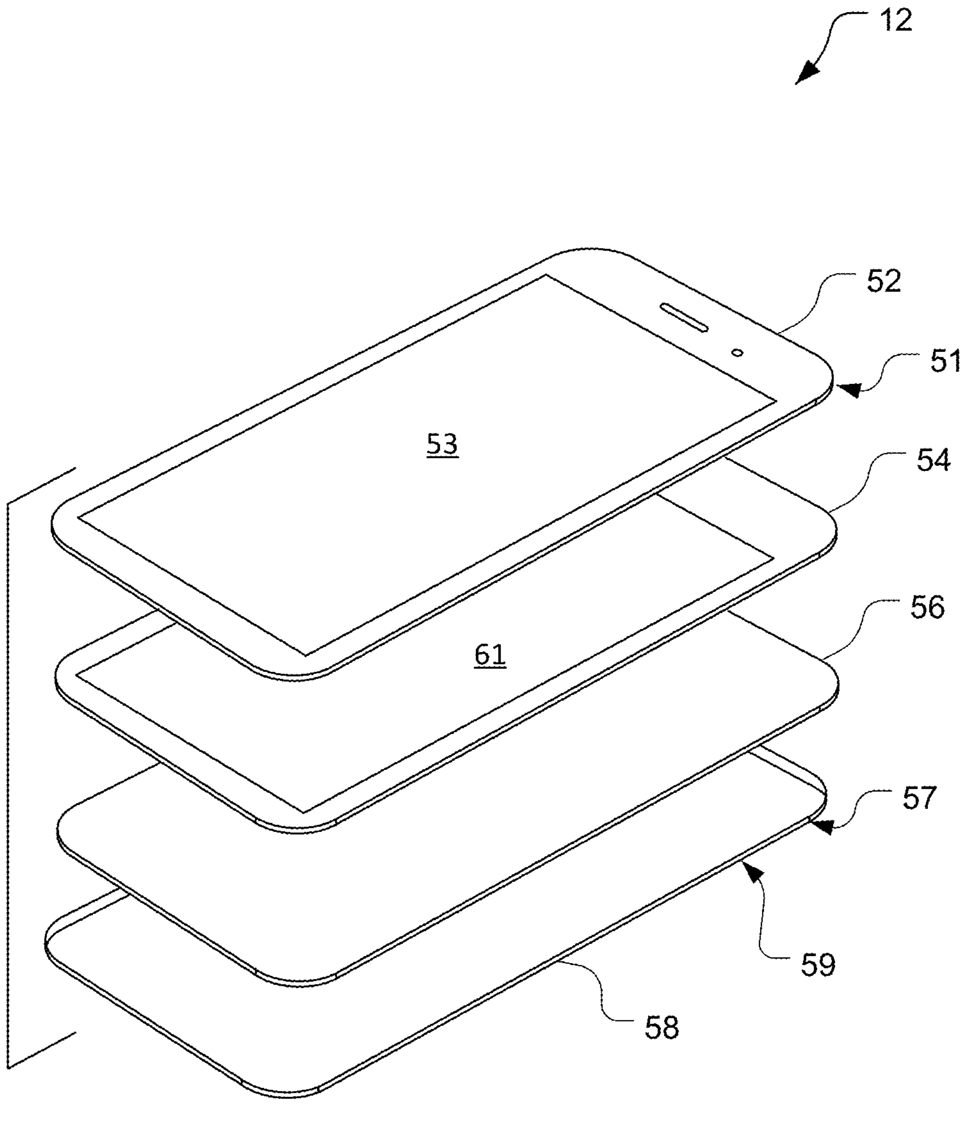
FIG. 2 is an exploded perspective view of simplified components of a mobile device shown in FIG. 1.

Referring to FIG. 2, an example of one of the mobile devices 12 shown in FIG. 1 includes a top cover 52, a display layer 54, a printed circuit board (PCB) layer 56, and a bottom cover 58. The mobile device 12 as shown may be a smartphone or a tablet computer but embodiments described herein are not limited to such devices. The top cover 52 includes a screen 53. The bottom cover 58 has a bottom surface 59. Sides 51, 57 of the top cover 52 and the bottom cover 58 provide an edge surface. The top cover 52 and the bottom cover 58 comprise a housing that retains the display layer 54, the PCB layer 56, and other components of the mobile device 12 that may or may not be on the PCB layer 56. For example, the housing may retain (e.g., hold, contain) or be integrated with antenna systems, front-end circuits, an intermediate-frequency circuit, and a processor discussed below. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 56 may not be commensurate with the size and/or shape of either of the top or bottom covers or otherwise with a perimeter of the device. For example, the PCB layer 56 may have a cutout to accept a battery. Those of skill in the art will therefore understand that embodiments of the PCB layer 56 other than those illustrated may be implemented.

Figure 3:
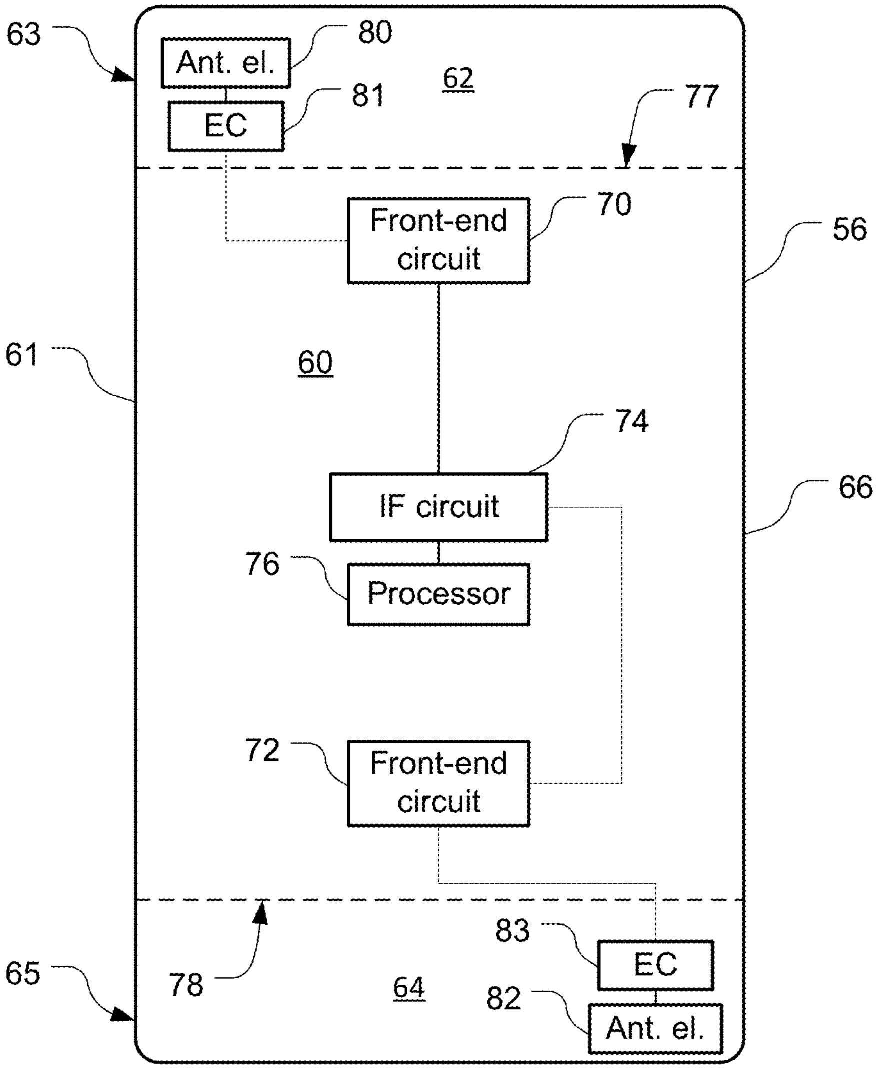
FIG. 3 is a top view of a printed circuit board, shown in FIG. 2, and antennas.

Referring also to FIG. 3, an example of the PCB layer 56 includes a main portion 60 and two antenna systems 62, 64. In the example shown, the antenna systems 62, 64 are disposed at opposite ends 63, 65 of the PCB layer 56, and thus, in this example, of the mobile device 12 (e.g., of the housing of the mobile device 12). The main portion 60 comprises a PCB 66 that includes front-end circuits 70, 72 (also called a radio frequency (RF) circuit), an intermediate-frequency (IF) circuit 74, and a processor 76. The front-end circuits 70, 72 may be configured to provide signals to be radiated to the antenna systems 62, 64 and to receive and process signals that are received by, and provided to the front-end circuits 70, 72 from, the antenna systems 62, 64. The front-end circuits 70, 72 may be configured to convert received IF signals from the IF circuit 74 to RF signals (amplifying with a power amplifier as appropriate), and provide the RF signals to the antenna systems 62, 64 for radiation. The front-end circuits 70, 72 are configured to convert RF signals received by the antenna systems 62, 64 to IF signals (e.g., using a low-noise amplifier and a mixer) and to send the IF signals to the IF circuit 74. The IF circuit 74 is configured to convert IF signals received from the front-end circuits 70, 72 to baseband signals and to provide the baseband signals to the processor 76. The IF circuit 74 is also configured to convert baseband signals provided by the processor 76 to IF signals, and to provide the IF signals to the front-end circuits 70, 72. The processor 76 is communicatively coupled to the IF circuit 74, which is communicatively coupled to the front-end circuits 70, 72, which are communicatively coupled to the antenna systems 62, 64, respectively. In some embodiments, transmission signals may be provided from the IF circuit 74 to the antenna system 62 and/or the antenna system 64 by bypassing the front-end circuit 70 and/or the front-end circuit 72, for example when further upconversion is not required by the front-end circuit 70 and/or the front-end circuit 72. Signals may also be received from the antenna system 62 and/or the antenna system 64 by bypassing the front-end circuit 70 and/or the front-end circuit 72. In other embodiments, a transceiver separate from the IF circuit 74 is configured to provide transmission signals to and/or receive signals from the antenna system 62 and/or the antenna system 64 without such signals passing through the front-end circuit 70 and/or the front-end circuit 72. In some embodiments, the front-end circuits 70, 72 are configured to amplify, filter, and/or route signals from the IF circuit 74 without upconversion to the antenna systems 62, 64. Similarly, the front-end circuits 70, 72 may be configured to amplify, filter, and/or route signals from the antenna systems 62, 64 without downconversion to the IF circuit 74.

In FIG. 3, the dashed lines separating the antenna systems 62, 64 from the PCB 66 indicate functional separation of the antenna systems 62, 64 (and the components thereof) from other portions of the PCB layer 56. Portions of the antenna systems 62, 64 may be integral with the PCB 66, being formed as integral components of the PCB 66. One or more components of the antenna system 62 and/or the antenna system 64 may be formed integrally with the PCB 66, and one or more other components may be formed separate from the PCB 66 and mounted to the PCB 66, or otherwise made part of the PCB layer 56. Alternatively, each of the antenna systems 62, 64 may be formed separately from the PCB 66 and coupled to the front-end circuits 70, 72, respectively. In some examples, one or more components of the antenna system 62 may be integrated with the front-end circuit 70, e.g., in a single module or on a single circuit board separate from the PCB 66. For example, the front-end circuit 70 may be physically attached to the antenna system 62, e.g., attached to a back side of a ground plane of the antenna system 62. Also or alternatively, one or more components of the antenna system 64 may be integrated with one or more components of the front-end circuit 72, e.g., in a single module or on a single circuit board. For example, an antenna of the antenna system 62 may have front-end circuitry electrically (conductively) coupled and physically attached to the antenna while another antenna may have the front-end circuitry physically separate, but electrically coupled to the other antenna. The antenna systems 62, 64 may be configured similarly to each other or differently from each other. For example, one or more components of either of the antenna systems 62, 64, may be omitted. As an example, the antenna system 62 may include 4G and 5G radiators while the antenna system 64 may not include (may omit) a 5G radiator. In other examples, an entire one of the antenna systems 62, 64 may be omitted. While the antenna systems 62, 64 are illustrated as being disposed at the top and bottom of the mobile device 12, other locations of the antenna system 62 and/or the antenna system 64 may be implemented. For example, one or more antenna systems may be disposed on a side of the mobile device 12. Further, more antenna systems than the two antenna systems 62, 64 may be implemented in the mobile device 12.

A display 61 (see FIG. 2) of the display layer 54 may roughly cover the same area as the PCB 66, or may extend over a significantly larger area (or at least over different regions) than the PCB 66, and may serve as a system ground plane for portions, e.g., feed lines or other components, of the antenna systems 62, 64 (and possibly other components of the device 12). The PCB 66 may also provide a ground plane for components of the system. The display 61 may be coupled to the PCB 66 to help the PCB 66 serve as a ground plane. The display 61 may be disposed below the antenna system 62 and above the antenna system 64 (with "above" and "below" being relative to the mobile device 12 as illustrated in FIG. 3, i.e., with a top of the mobile device 12 being above other components regardless of an orientation of the device 12 relative to the Earth). In some embodiments, the antenna systems 62, 64 may have widths approximately equal to a width of the display 61. The antenna systems 62, 64 may extend less than about 10 mm (e.g., 8 mm) from edges, here ends 77, 78, of the display 61 (shown in FIG. 3 as coinciding with ends of the PCB 66 for convenience, although ends of the PCB 66 and the display 61 may not coincide). This may provide sufficient electrical characteristics for communication using the antenna systems 62, 64 without occupying a large area within the device 12. In some embodiments, one or more of the antenna systems 62, 64 partially or wholly overlaps with the PCB 66 and/or the display 61. In some embodiments, one or more antenna systems are disposed to the side (relative to the mobile device 12 as illustrated in FIG. 3) of the PCB 66 and/or the display 61. In some embodiments, one or more antenna systems wrap around a corner of the mobile device 12 such that the antenna system is disposed either above or below the PCB 66 and/or the display 61 and also to the side of the PCB 66 and/or the display 61.

The antenna system 62 includes one or more antenna elements 80 and one or more corresponding energy couplers 81, and the antenna system 64 includes one or more antenna elements 82 and one or more corresponding energy couplers 83. The antenna elements 80, 82 may be referred to as "radiators" although the antenna elements 80, 82 may radiate energy and/or receive energy. The energy couplers may be referred to as "feeds," but an energy coupler may convey energy to a radiator from a front-end circuit, or may convey energy from a radiator to the front-end circuit. An energy coupler may be conductively connected to a radiator or may be physically separate from the radiator and configured to reactively (capacitively and/or inductively) couple energy to or from the radiator.

Example Antenna System—Stacked Patches Including Multi-Piece Parasitic Patch

Figure 4:
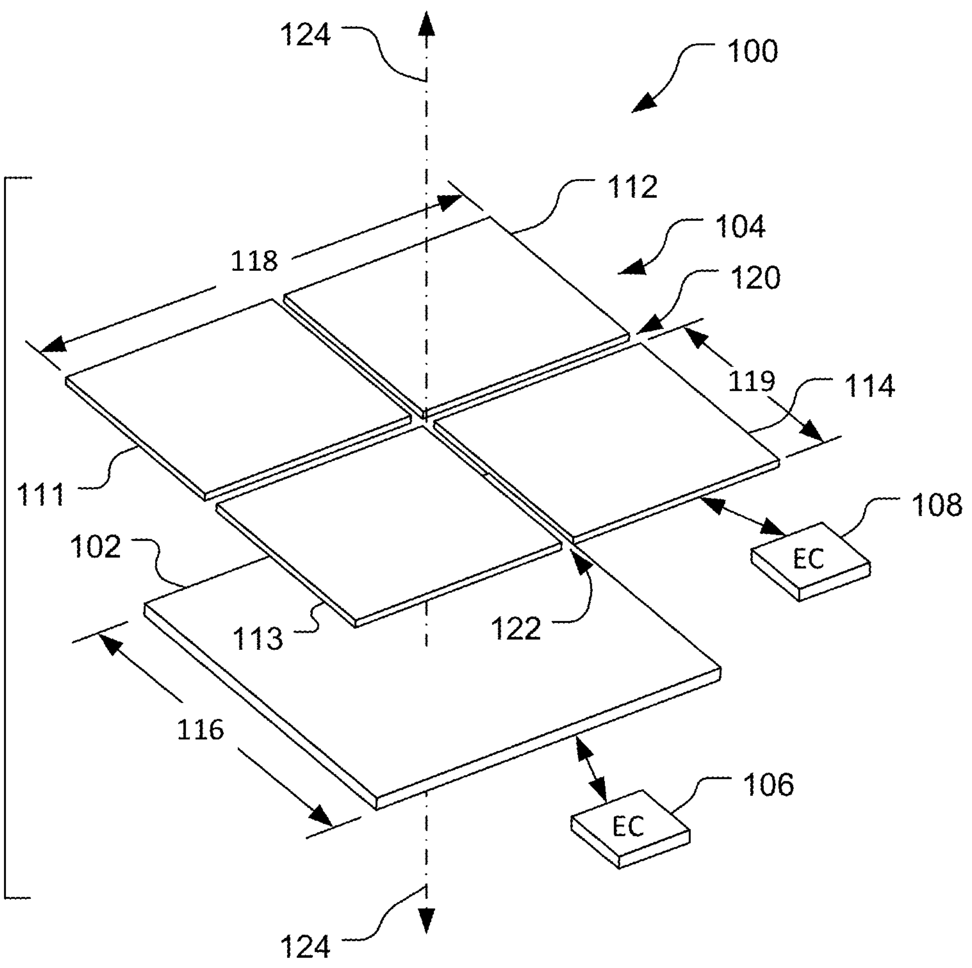
FIG. 4 is a perspective view of an example of an antenna system shown in FIG. 3.

Referring to FIG. 4, with further reference to FIG. 3, an antenna system 100 is an example of the antenna system 62 (or the antenna system 64). The antenna system 100 is a stacked-patch antenna system including patch antenna elements 102, 104, and energy couplers 106, 108. The antenna system 100 may be configured to operate over multiple frequency bands, with broadband operation in each band. For example, the antenna system 100 may operate in frequency bands where frequencies in a first band (a higher frequency band) are about twice frequencies in a second band (a lower frequency band). That is, frequencies in the second band are about half frequencies in the first band, such as a 28 GHz band (e.g., from 28 GHz to 44 GHz) and a 60 GHz band (e.g., from 57.5 GHz to 67.5 GHz). The antenna system 100 may be configured to operate over multiple frequency bands in that a return loss for radiation (even if the system is not used for radiation) may be below a threshold level, e.g., −3 dB, or −5 dB, or −10 dB (or other value) over the frequency bands of operation, and/or the system 100 may have a resonance in each frequency band of operation. Sub-systems of the system 100 for operation in different bands are co-located, e.g., being disposed at the same location, and in examples discussed herein, the sub-systems share one or more components. The patch antenna element 104 may be configured to provide additional bandwidth (e.g., for 5G operation) in comparison to a configuration in which the patch antenna element 102 is used without the patch antenna element 104. Further, the patch antenna element 104 here includes multiple (smaller) patch elements and one or more of the smaller patch elements, e.g., one or more subsets of the smaller patch elements, may be used to provide antenna operation in a different band, e.g., a 60 GHz band. Thus, the antenna system 100 is configured such that at least a portion of the patch antenna element 104 may be shared for operation in both the lower frequency band and the higher frequency band (i.e., as part of a first frequency band antenna sub-system and as part of a second frequency band antenna sub-system). For example, the patch antenna elements 102, 104, in conjunction with the energy coupler 106, may operate as an active patch and a parasitic patch in a first frequency band, e.g., the 28 GHz band, and portions of the patch antenna element 104, in conjunction with the energy coupler 108, may operate as one or more dipoles in another frequency band, e.g., the 60 GHz frequency band. One or more elements of the patch antenna element 104 (separately or together) may operate as a parasitic patch, being configured to radiate due to energy reactively (capacitively and/or inductively) coupled from another (e.g., patch) radiator, and not being electrically connected to, or disposed to be an active radiator that is configured to be a primary recipient of energy from, an energy coupler (here the energy coupler 106) that is configured to provide energy of a frequency for which the element is a parasitic element. The shared component(s) for the different frequency bands of operation may help the antenna system 100 provide a compact, low-profile antenna system. The stacked patches may help the antenna system provide broadband performance. Sharing one or more components may help a small form-factor system provide multi-band performance.

The patch antenna element 102 is electrically conductive and sized and shaped for operation over a desired frequency band. For example, the patch antenna element 102 may radiate more than half of the energy provided to the patch antenna element 102 in the desired frequency band, or may have a resonance in the desired frequency band, etc. In the example shown, the patch antenna element 102 is rectangular, in this case being substantially square, with side lengths 116 each within 5% in length of each other and each of about half of a wavelength (e.g., 40%-60% of the wavelength) of a signal having a frequency in the desired frequency band (e.g., the lower frequency band) and traveling in a substrate of the antenna system 100, e.g., a dielectric on which or in which the patch antenna element 102 is disposed. For example, the wavelength may be a wavelength in a substrate (not shown) separating the patch antenna elements 102, 104. The side lengths in this example are edge lengths of edges configured to radiate or receive electromagnetic signals. The patch antenna element 104, in this example, is a parasitic patch antenna element and comprises multiple (here, four) physically separate electrically conductive portions 111, 112, 113, 114. The portions 111-114 of the patch antenna element 104 are each conductive, and may be sized, shaped, and disposed relative to each other to reactively couple to each other.

The patch antenna element 104 may be sized, shaped, and disposed relative to the patch antenna element 102 to serve as a parasitic patch element for the patch antenna element 102. The patch antenna element 104 may be shaped (here substantially as a square) similarly to the patch antenna element 102, e.g., the patch antenna element 102 has a perimeter with a shape that is similar to a perimeter shape of a perimeter bounding the patch antenna element 104 (enclosing all of the portions 111-114 and gaps between the portions 111-114; see the discussion below of the perimeter 151). The perimeter shapes may be substantially square, e.g., with side lengths all within 5% of each other. The patch antenna element 104 may have a side length 118 that is longer than the side length 116, with the relative lengths depending on several factors including spacing between the patch antenna elements 102, 104 and desired resonating profile. The patch antenna element 104, and the combination of the patch antenna elements 102, 104, may have a resonant frequency different from a resonant frequency of the patch antenna element 102, which may help increase an overall bandwidth of the combination of the elements 102, 104. For example, the combination of the patch antenna elements 102, 104 may resonate at about 24 GHz (e.g., 22-26 GHz) while the patch antenna element 102 may resonate at about 35 GHz (e.g., 33-37 GHz). Here, each of the portions 111-114 of the patch antenna element 104 is also substantially square (e.g., with sides within 5% in length of each other), with pairs of the portions 111-114 separated by gaps 120, 122. The size(s) of the gaps 120, 122 may be selected, e.g., empirically, to affect coupling between the portions 111-114 to achieve one or more desired performance characteristics (e.g., return loss, or antenna pattern, etc.). Side lengths 119 of each of the portions 111-114 may be about one-half of a wavelength (e.g., 40%-60% of the wavelength) of a signal having a frequency in a desired frequency band (e.g., the higher frequency band) and traveling in a substrate of the antenna system 100, e.g., a dielectric on which or in which the portions 111-114 are disposed. The side lengths 116, 119 may be sized relative to each other and may depend on the frequency bands of operation. For example, the side lengths 116 may be about twice (e.g., twice ±5%) each of the side lengths 119 with the lower frequency band being from 28 GHz to 44 GHz and the higher frequency band being from 57.5 GHz to 67.5 GHz. As a parasitic patch element, the patch antenna element 104 may improve the bandwidth of the patch antenna element 102. The bandwidth may be improved by the frequency band over which the patch antenna element 102 converts energy between electrical signals and electromagnetic waves. That is, the antenna system 100 may receive electrical signals and radiate corresponding electromagnetic waves with acceptable loss over a wider range of frequencies than without the patch antenna element 104, and/or may receive electromagnetic waves and convey corresponding electrical signals over a range of frequencies with less loss than without the patch antenna element 104. The patch antenna element 104 may not be directly electrically connected to receive or convey energy in the lower frequency band, e.g., from or to one or more other components such as front-end circuitry (e.g., the front-end circuit 70 or the front-end circuit 72). The patch antenna element 104 may be reactively coupled to receive and/or convey energy in the lower frequency band, e.g., from and/or to the patch antenna element 102, and may be directly electrically connected (e.g., to the energy coupler 108) to receiver and/or convey energy in the higher frequency band from or to one or more other components such as a front-end circuit. Here, the patch antenna element 104 overlaps the patch antenna element 102, with both of the antenna elements 102, 104 being centered about an axis 124 perpendicular to both of the antenna elements 102, 104.

The patch antenna element 104 is a split antenna element. The patch antenna element 104 is segmented, in this example into the four portions 111-114. Thus, the patch antenna element 104 is non-contiguous, comprising not a monolithic conductor (e.g., conductive sheet), but multiple discontinuous conductive portions, here substantially square conductive sheet portions. While the patch antenna element 102, the patch antenna element 104, and the portions 111-114 in this example are all substantially square, other shapes may be used. For example, other non-square rectangular shapes of patches may be used. In some embodiments, the two lengths of the sides of the non-square rectangles may be configured to radiate at two respective frequencies, thereby creating a dual resonance and in some embodiments effectively extending the bandwidth across the two respective frequencies. As another example, shapes for the patch antenna element 104 that are rotationally symmetric about the axis 124 with portions that are equidistant from the axis 124 along orthogonal lines intersecting at the axis 124 may be used. In some embodiments, the portions 111-114 are elliptical and the element 104 is arranged in a clover or bowtie shape.

The energy couplers 106, 108 are configured and disposed to provide energy to and/or receive energy from the patch antenna elements 102, 104, respectively. The energy coupler 106 may directly or indirectly provide energy to and/or receive energy from the patch antenna element 102. For example, the energy coupler 106 may comprise one or more electrically-conductive transmission lines, e.g., a microstrip line, a conductive rod, etc., physically connected to the patch antenna element 102. Alternatively, the energy coupler 106 may comprise a device that is physically separate from the patch antenna element 102 and that is configured and disposed to reactively couple energy to and/or from the patch antenna element 102. The energy coupler 108 may directly or indirectly provide energy to and/or receive energy from the patch antenna element 104. For example, the energy coupler 108 may comprise a plurality of electrically-conductive transmission lines physically connected to the patch antenna element 104. The energy coupler may comprise one or more pairs of conductors coupled to respective pairs of the portions 111-114. For example, one pair of conductors may be connected to the portions 111 and 114, and another pair of conductors may be connected to the portions 112 and 113, e.g., to operate the pair of the portions 111, 114 as one dipole and the pair of the portions 112, 113 as another dipole. For example, the energy coupler 108 may be connected to the portions 111-114 near the axis 124, and may pass through the patch antenna element 102 (e.g., as discussed further below). The patch antenna element 104 and the energy coupler 108 are configured such that at least a part of the patch antenna element 104 may be operated in the higher frequency band in one mode without exciting a mode (at least with significant energy, e.g., sufficient to significantly negatively affect the higher-frequency operation) in the patch antenna element 102. The different modes may help provide isolation between operation in the different frequency bands.

For simplicity of the figure, other possible features of the antenna system 100 are not shown in FIG. 4. For example, a substrate on and/or in which components of the system 100 may be disposed is not shown. As another example, a ground plane may be useful for operation of the antenna system 100 but may not be part of the antenna system 100 itself. For example, a ground plane of another component of an apparatus in which the antenna system 100 is disposed may serve as a ground plane for the antenna system 100. For example, the display 61 (see FIG. 2) or a ground plane of the PCB 66 (see FIG. 3) may serve as a ground plane for the antenna system 100. In other embodiments, a ground plane separate from the display 61 and the PCB 66 is disposed relative to the antenna system 100. For example, a ground plane may be configured in a substrate on which the antenna elements 102, 104 are implemented, or otherwise within a module in which the antenna system 100 is packaged.

Examples of Stacked Patches Including a Multi-Piece Parasitic Patch

Figure 5:
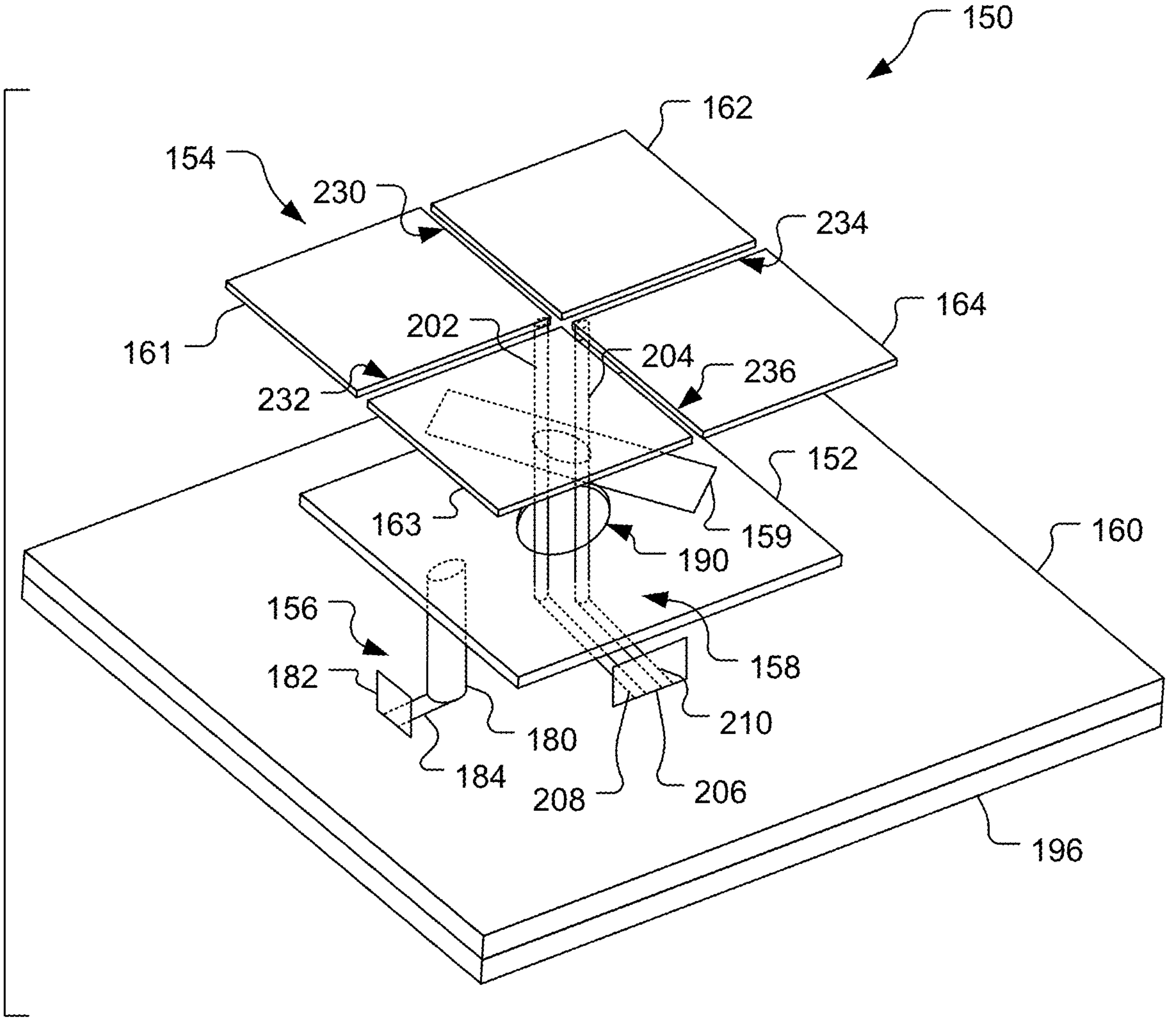
FIG. 5 is a perspective view of an example of the antenna system shown in FIG. 4.
Figure 6:
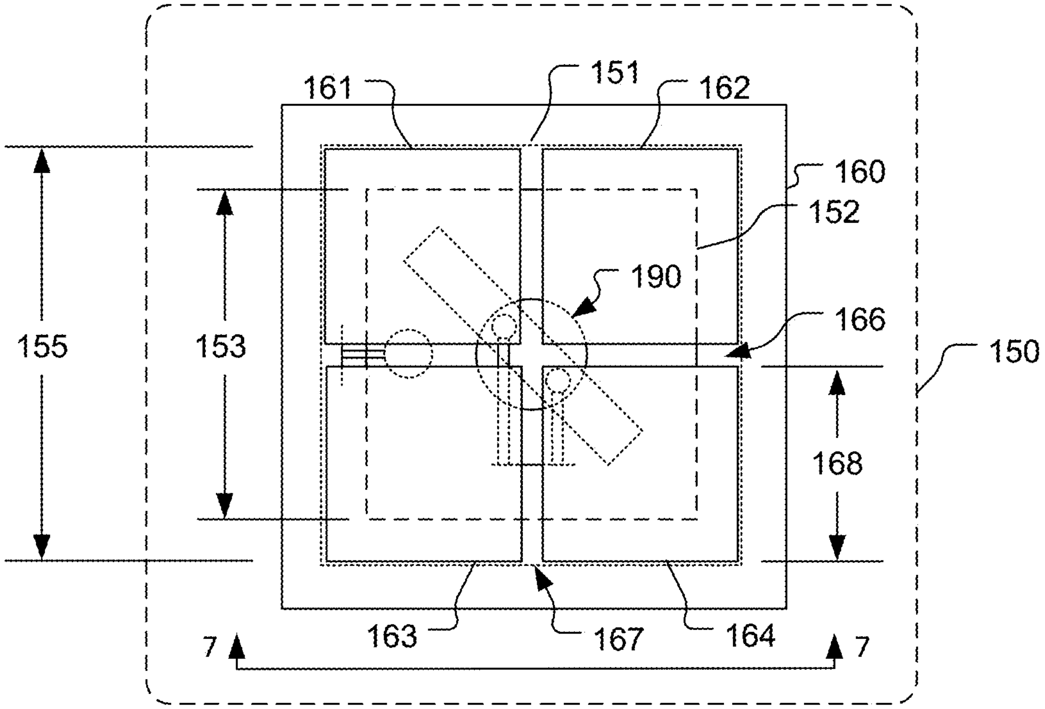
FIG. 6 is a top view of the antenna system shown in FIG. 5.
Figure 7:
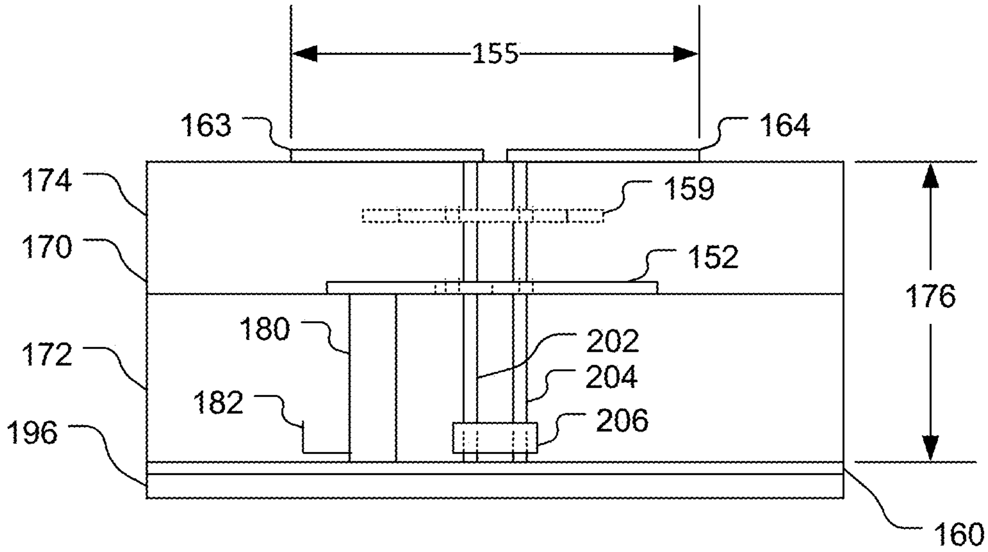
FIG. 7 is a side view of the antenna system shown in FIG. 5, taken along line 7-7 shown in FIG. 6.

Referring to FIGS. 5-7, with further reference to FIGS. 3-4, an antenna system 150 is an example of the antenna system 100 shown in FIG. 4. The antenna system 150 is a multi-band antenna system configured to operate over a lower frequency band and a higher frequency band. The antenna system 150 includes patch antenna elements 152, 154, energy couplers 156, 158, and a ground plane 160, and optionally includes a tuning element 159 and a connection layer 196. The patch antenna elements 152, 154 are configured to operate in tandem as an active patch antenna element and a parasitic patch antenna element, respectively. The patch antenna element 154 is a multi-purpose element configured to serve at least dual purposes, to operate as both the parasitic patch antenna element for the patch antenna element 152 and as one or more antenna elements, here dipoles, configured to radiate and/or receive wireless signals. The patch antenna element 154 may be parasitically coupled to the patch antenna element 152 for operation in one mode (e.g., as a stacked-patch antenna in the lower frequency band) and directly coupled to an energy coupler for operation in another mode (e.g., as a dipole for the higher frequency band). For the sake of simplicity of the figure, a substrate 170 that separates the ground plane 160 from the patch antenna element 152, and the patch antenna element 152 from the patch antenna element 154 (and the tuning element 159 if present) is not shown in FIG. 5, but is shown in FIG. 7. The substrate 170 includes substrate layers 172, 174 of dielectric material. The layers 172, 174 may comprise the same material, or may comprise different materials, e.g., with different dielectric constants. Depending upon the location of a signal in the substrate 170 and geometry of the substrate 170 (e.g., the thicknesses of the layers 172, 174), a wavelength of a signal in the substrate 170 may be a wavelength in the layer of the signal or may be an effective wavelength due to an effective dielectric constant of multiple layers of the substrate 170. For example, an effective dielectric constant may be a combination of the dielectric constants of the layers 172, 174.

The patch antenna elements 152, 154, in conjunction with the ground plane 160 and the energy coupler 156, may comprise a stacked-patch antenna. The patch antenna element 152 is an active patch in that the energy coupler 156 is configured to provide energy to and/or receive energy from the patch antenna element 152 either by direct connection (e.g., physical conductive connection) or indirect connection (e.g., reactive coupling). In the embodiment illustrated in FIGS. 5-7 the energy coupler 156 includes a conductor 180 that is directly conductively connected to the patch antenna element 152. The patch antenna element 152 may comprise a planar conductor disposed on the substrate layer 172 and configured to radiate and receive energy in orthogonal polarizations. In this example, the patch antenna element 152 is substantially square, with side lengths 153 (see FIG. 6) about one-half of a wavelength (e.g., 40%-60% of the wavelength), in the substrate 170, of signals in the lower frequency band, e.g., from 27.5 GHz to 44 GHz. For example, the side lengths 153 may be about one-half of a wavelength (e.g., 40%-60% of the wavelength), in the substrate 170, of a signal having a frequency of about 35 GHz (e.g., between 34.5 GHz and 35.5 GHz). The patch antenna element 154 may be disposed a distance 176 from the ground plane 160 where the distance 176 is about one-third of the wavelength, in the substrate 170, of a frequency in the lower frequency band.

The energy coupler 156 may further include a tuning stub 182. The tuning stub 182 may itself be conductive and is connected to the conductor 180 by a line 184, and together with the line 184 may form a tuner that is configured (e.g., sized and disposed) to improve coupling (e.g., improve an impedance match) between the conductor 180 and the patch antenna element 152 compared to not having the tuning stub 182 connected to the conductor 180 by the line 184. The tuning stub 182 and the line 184 are separated from the ground plane 160, e.g., by a thin layer of the substrate 170 (see FIG. 7).

The energy coupler 156 may be connected to the front-end circuit 70 (see FIG. 3) by one or more appropriate conductors in the connection layer 196. The patch antenna element 152 may thus be directly electrically connected by the conductor 180 to the connection layer 196 and thus to the front-end circuit 70 to receive energy (in the lower frequency band) from and/or convey energy (in the lower frequency band) to the front-end circuit 70. While in this example, the energy coupler 156 comprises a single conductor 180, another similar conductor (and optionally a similar corresponding tuning stub) may be provided and connected to the patch antenna element 152. For example, this other conductor (and optional tuning stub) may be connected to the patch antenna element 152 to operate the patch antenna element 152 with an orthogonal polarization compared to that induced by the conductor 180 such that the patch antenna element 152 may be operated as an orthogonally-polarized patch antenna element. In some embodiments, this other conductor (and optional tuning stub) may form an additional energy coupler to operate the patch antenna element 152, in conjunction with the energy coupler 156. Further, while the conductor 180 is illustrated as being directly conductively connected to the patch antenna element 152, the conductor 180 (or one or more of the multiple conductors, for example when another conductor is used to provide an orthogonal polarization) may be coupled to the patch antenna element 152 in other manners. For example, the conductor 180 may extend up to a region that is aligned with (e.g., in a same plane as) a plane of the patch antenna element 152, but may be separated from the patch antenna element 152 by a gap so as to form a proximity feed (or gap feed) for the patch antenna element 152. In other embodiments, the conductor 180 does not extend all the way up to a plane of the patch antenna element 152, but rather is physically separated from (the plane and) the patch antenna element 152, and communicatively coupled thereto.

The patch antenna element 154 may be configured and disposed to operate in conjunction with the patch antenna element 152. The patch antenna element 154 may be configured and disposed to operate as a parasitic patch antenna element, for example to improve a bandwidth of the patch antenna element 152. Here, the patch antenna element 154 has a perimeter 151 (see FIG. 6) that is substantially the same shape as the patch antenna element 152, here being substantially square, with the patch antenna element 154 having side lengths 155 (see FIGS. 6-7) that are longer than the side lengths 153 of the patch antenna element 152. Other shapes of patch antenna elements, e.g., circles, may be used. The patch antenna element 154 may include multiple separate conductive planar portions, in this example four antenna element portions 161, 162, 163, 164, disposed on the substrate layer 174. In this example, each of the portions 161-164 is disposed in a respective quadrant of the perimeter 151. Each of the antenna element portions 161-164 in this example may be conductive patches that are substantially square, being separated from each other by gaps 166, 167, and having side lengths 168. The antenna element portions 161-164 may be disposed such that the gaps 166, 167 permit reactive coupling between adjacent ones of the antenna element portions 161-164 such that portions 161-164 of the patch antenna element 154 can effectively operate as a single unit over the frequencies of the lower frequency band. In some embodiments, the width of the gaps 166, 167 (e.g., a distance between adjacent conductive patches) is approximately equal to or less than $1/8^{th}$, $1/16^{th}$, $1/20^{th}$, or $1/32^{nd}$ (or less) of a wavelength of signals in the higher frequency band. The antenna system 150 may not include any substrate disposed on the substrate layer 174 or the patch antenna element 154, and thus the patch antenna element 154 may be exposed to free space (although perhaps also exposed to a case, which may have a low dielectric constant, of a mobile device inside which the antenna system 150 is disposed, or a shield or other packaging component formed over the antenna system 150 or a portion thereof). The patch antenna element 154 may be disposed relative to the patch antenna element 152 with the elements 152, 154 overlapping, being centered about a common axis, and oriented with edges of each of the elements 152, 154 being parallel or perpendicular to edges of the other antenna element 152, 154.

The side lengths 155 of the patch antenna element 154 may be about one-half of a wavelength (e.g., 40%-60% of a wavelength) of a frequency in the lower frequency band in the substrate layer 174. For example, for a frequency of 30 GHz, and a dielectric constant of 3.4 for the substrate layer 174, the side lengths 155 may be about 2.47 mm (with one-half of a wavelength at 30 GHz in a 3.4 dielectric constant substrate being about 2.71 mm). In this example, the side lengths 153 of the patch antenna element 152 may be about 2 mm. The side lengths 153 may be less than one-half of the wavelength due to an opening 190 (discussed further below) provided by the patch antenna element 152 that makes the patch antenna element 152 more inductive than without the opening 190.

The patch antenna element 152 defines the opening 190 through which portions of the energy coupler 158 are disposed. The patch antenna element 152 provides the opening 190 in a center of the patch antenna element 152 to help limit electrical effects of passage of the portions of the energy coupler 158 through the patch antenna element 152. A central portion of the patch antenna element 152 will have vanishing electric field (toward a center line, e.g., see the axis 124 in FIG. 4) in use such that the opening 190 and the presence of the energy coupler 158 through the opening 190 will have little if any consequence on the operation (e.g., antenna pattern, return loss) of the patch antenna element 152. A size of the opening 190 may be selected, e.g., empirically, as a tradeoff between operation of the patch antenna element 104 in the higher frequency band (e.g., as one or more dipoles) and operation (e.g., antenna pattern, return loss) of the combination of the patch antenna elements 152, 154 in the lower frequency band. As the size of the opening 190 is increased, a resonant frequency of the patch antenna element 152 may decrease and the inductance of the patch antenna element 152 may increase, which may be compensated by making the size of the patch antenna element 152 smaller. The opening 190 in this example is circular, although other shapes of openings may be used. The patch antenna element 152 may be (although not required to be) symmetric about a center of the patch antenna element 152, e.g., about a center of a perimeter of the patch antenna element 152, for dual-polarization operation.

The energy coupler 158 may be configured to couple energy to and/or from respective ones of the antenna element portions 161-164. In this example, the energy coupler is configured to couple energy to/from the antenna element portions 161 and 164, but in other examples the energy coupler 158 may be configured to couple energy to the antenna element portions 162 and 163 instead of, or in addition to, the antenna element portions 161 and 164. The energy coupler 158 is configured to couple energy to and/or from one or more subsets of the antenna element portions 161-164, here each subset comprising a pair (i.e., two) of the portions 161-164 in diagonally disposed quadrants of the perimeter 151. Here, the energy coupler 158 includes a pair of conductors 202, 204 that are directly conductively connected to the antenna element portions 161, 164, respectively, of the patch antenna element 154. The conductors 202, 204 may be parallel conductive lines, e.g., twin lines, and may be connected to the front-end circuit 70 by appropriate conductors in the connection layer 196. The patch antenna element 154 may thus directly electrically connect the conductors 202, 204 to the connection layer 196 and thus to the front-end circuit 70 to receive energy (in the higher frequency band) from and/or convey energy (in the higher frequency band) to the front-end circuit 70. The conductors 202, 204 are disposed in the opening 190 and displaced from (being physically separate from, not connected to) the patch antenna element 152 to inhibit coupling between the conductors 202, 204 and the patch antenna element 152. While in this example, the energy coupler 158 comprises two conductors 202, 204, more conductors (and optionally one or more other corresponding tuning stubs, discussed further below) may be provided for further operation of the patch antenna element 154, e.g., with orthogonal polarizations such as with conductors connected to the antenna element portions 162, 163 to operate the portions 162, 163 as another dipole. In that case, conductors may be connected to distinct subsets of the portions 161-164, e.g., with the conductors 202, 204 connected to the portions 161, 164 and the other conductors connected to the antenna element portions 162, 163. The subsets are respective kitty-corner portions of the patch antenna element 154, e.g., the portions 161, 164 diagonally opposite in one subset and the portions 162, 163 diagonally opposite in the other subset. The different sets of conductors may be connected to the front-end circuit 70 to be differentially fed to inhibit coupling between the conductors, i.e., the conductors 202, 204 as one set for the dipole of the antenna element portions 161, 164 and the other conductors as another set for the dipole of the antenna element portions 162, 163. That is, the respective pairs of conductors may be fed 180° out of phase with respect to each other. The conductors 202, 204 may be shielded, even if operated differentially. While the conductors 202, 204 are illustrated as being directly conductively connected to the antenna element portions 161, 164, the conductors 202, 204 may be coupled to the patch antenna element 154 in other manners. For example, the conductors 202, 204 may extend up to a region that is aligned with (e.g., in a same plane as) a plane of the antenna element 154, but may be separated from the antenna element portions 161, 164, respectively by a gap so as to form a proximity feed (or gap feed) for the antenna element portions 161, 164. In other embodiments, one or more of the conductors 202, 204 do not extend all the way up to a plane of the antenna element 154, but rather are physically separated from (the plane and) the antenna element portions 161 and/or 164, and communicatively coupled thereto.

The energy coupler 158 further includes a tuning stub 206, connected to the conductors 202, 204 by lines 208, 210, respectively. The tuning stub 206 together with the lines 208, 210 form a tuner that is configured (e.g., sized and disposed) to improve coupling (e.g., improve impedance matches) between the conductors 202, 204 and the antenna element portions 161, 164 compared to not having the tuning stub 206 connected to the conductors 202, 204 by the lines 208, 210. The tuning stub 206 and the lines 208, 210 are separated from the ground plane 160, e.g., by a thin layer of the substrate 170 (see FIG. 7). The tuning stub 206 is connected to both of the conductors 202, 204, but in other configurations, separate tuning stubs may be connected to the conductors 202, 204.

The antenna element portions 161, 164 are configured to operate in conjunction with the energy coupler 158 as an antenna element, here a dipole, separate from the patch antenna element 154. The antenna element portions 161, 164 may receive energy in the higher frequency band from the energy coupler 158 and radiate energy in the higher frequency band. Also or alternatively, the antenna element portions 161, 164 may receive energy in the higher frequency band and provide energy in the higher frequency band to the energy coupler 158 for conveyance to the front-end circuit 70. Each of the antenna element portions 161, 164 may comprise a planar conductor disposed on the substrate layer 174 and configured to radiate and/or receive energy in orthogonal polarizations. In this example, each of the antenna element portions 161, 164 is substantially square, with side lengths 168 (see FIG. 6) about one-half of a wavelength (e.g., 40%-60% of the wavelength), in the substrate 170, of signals in the higher frequency band, e.g., from 57.5 GHz to 67.5 GHz. For example, for a frequency of 60 GHz, and a dielectric constant of 3.4 for the substrate layer 174, the side lengths 168 may be about 1.55 mm (with one-half of a wavelength at 60 GHz in a 3.4 dielectric constant substrate being about 1.35 mm). The portions 161, 164 are configured to radiate energy received from the conductors 202, 204, respectively, along edges 230, 232 and 234, 236, respectively, and/or to receive energy along the edges 230, 232 and 234, 236 and provide the received energy to the conductors 202, 204, respectively. The edges 230, 236 may act in concert as a full-wavelength antenna element as may the edges 232, 234. The combination of the edges 230, 236 and the edges 232, 234 may result in a full-wavelength dipole antenna element and a full-wavelength slot, with polarizations of the dipole and the slot being reversed.

Figure 8:
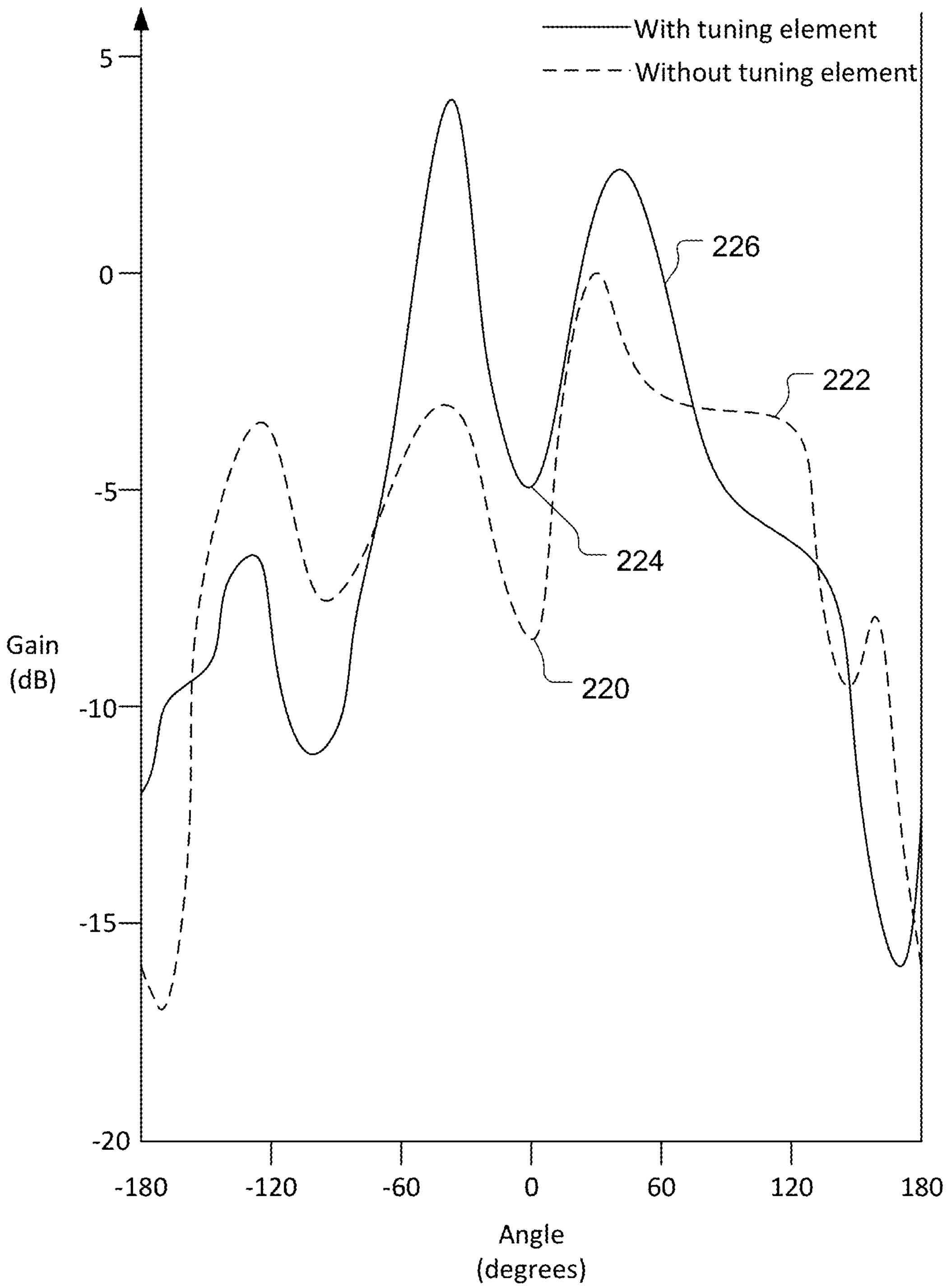
FIG. 8 is a graph of antenna gain of a dipole shown in FIGS. 5-6 as a function of angle (boresight being 0°) at a frequency of 57 GHz with and without an optional tuning element shown in FIGS. 5-7.

The dipole formed by the antenna element portions 161, 164, being a full wavelength dipole (as the side lengths 168 are each about one-half wavelength long), may have an antenna pattern similar to that of a full-wavelength slot, with a null at boresight (e.g., in a direction perpendicular to a plane of the patch antenna element 154, e.g., such as the axis 124 shown in FIG. 4) absent some compensating structure. The tuning element 159 (also referred to as a tuner) may be a quarter-wavelength tuner, connected to and extending away from each of the conductors 202, 204 by about a quarter of a wavelength (e.g., a quarter wavelength ±10% or less) in the substrate 170 at the higher frequency band (e.g., about 63 GHz). The tuning element 159 may comprise one or more conductive, e.g., metal, strips. The optional tuning element 159 may help fill, at least partially, the null in the antenna pattern of the dipole comprising the portions 161, 164, and a dipole comprising the portions 162, 163, and thus may help the system 150 provide broadband operation in the higher frequency band. For example, as shown in FIG. 8, a null 220 (of about −8.5 dB) near boresight (0°) in a plot 222 of antenna gain of the dipole comprising the portions 161, 164 without the tuning element 159 present is reduced to a null 224 (of about −5 dB) in a plot 226 of antenna gain of the dipole comprising the portions 161, 164 with the tuning element 159 present. Further, while only one tuning element 159 is shown, more than one tuning element 159 may be used. For example, two tuning elements 159 could be disposed between the patch antenna element 152 and the patch antenna element 154, e.g., with similar orientation, overlapping each other, but in different layers of the antenna system 150.

Figure 9:
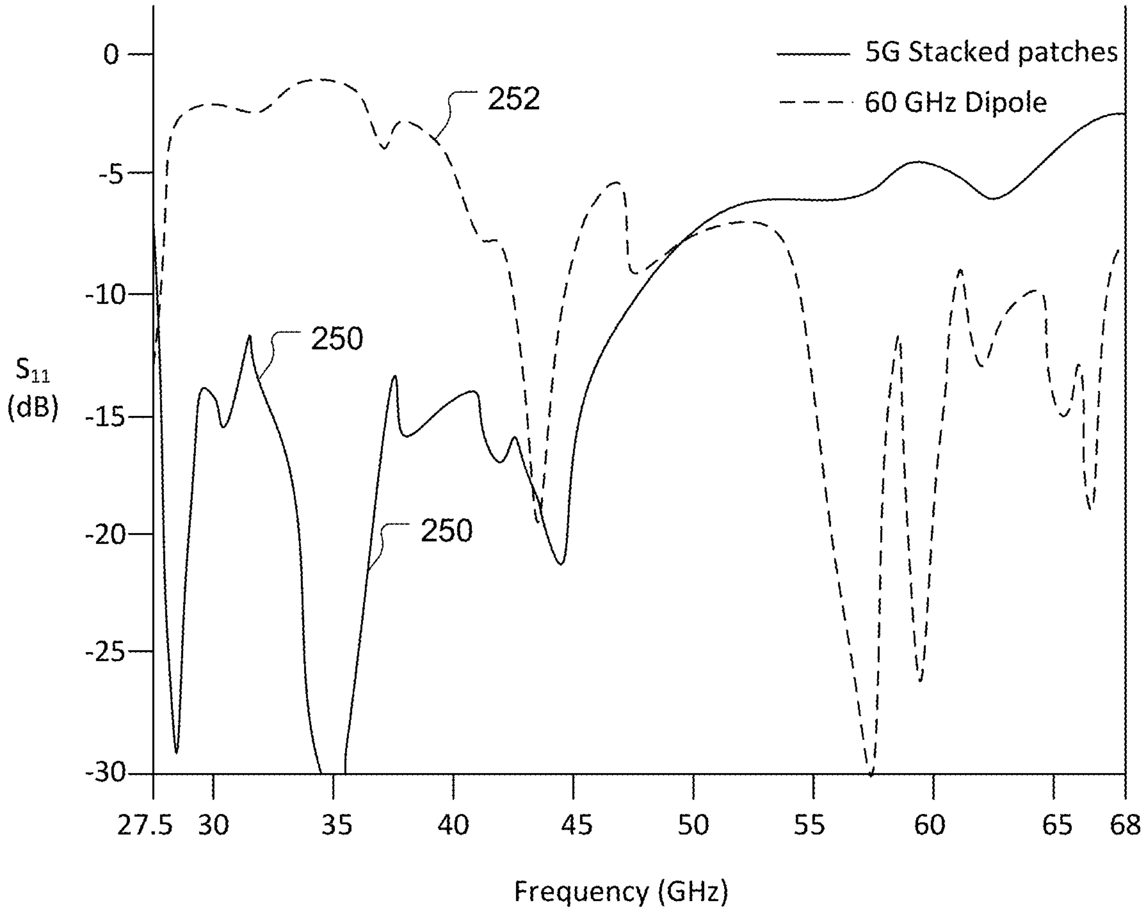
FIG. 9 is a graph of return loss for stacked patches and a dipole, respectively, shown in FIGS. 5-7.

Referring also to FIG. 9, the antenna system 150 may have low return loss over multiple frequency bands, here over both 28 GHz and 60 GHz bands. Plots shown in FIG. 9 are approximations of computer-simulated return loss for components of the antenna system 150. As shown by a plot 250, the stacked-patch combination of the patch antenna elements 152, 154 of the antenna system 150 has a return loss ($S_{11}$) below −10 dB over a range from about 28 GHz to about 48 GHz and below −7 dB over a range from about 27.5 GHz to about 53 GHz. Thus, the patch antenna elements 152, 154 may be said to radiate well (e.g., with a return loss less than −7 dB) over the 5G frequency range from 27.5 GHz to 44 GHz. Further, as shown by a plot 252, the dipole of the portions 161, 164 of the patch antenna element 154 has a return loss below −8 dB over the frequency range from 57 GHz to 68 GHz, and indeed over a range from about 54 GHz to 68 GHz. Depending on a threshold corresponding to what is considered "radiation" or to "radiate well," the antenna system 150 may be considered to be configured to radiate or to radiate well over various frequency bands. For example, if a threshold of −5 dB return loss is used, then the antenna system 150 may be considered to radiate, or radiate well, over at least a range from 27.5 GHz to 68 GHz, with the stacked patch antenna elements 152, 154 radiating well over 27.5 GHz (or less) to about 57 GHz, and the dipole portion of the patch antenna element 154 radiating well over a range from about 40.5 GHz to at least 68 GHz.

Array Using Multi-Band Stacked Patch Antenna with Multi-Piece Parasitic Patch

Figure 10:
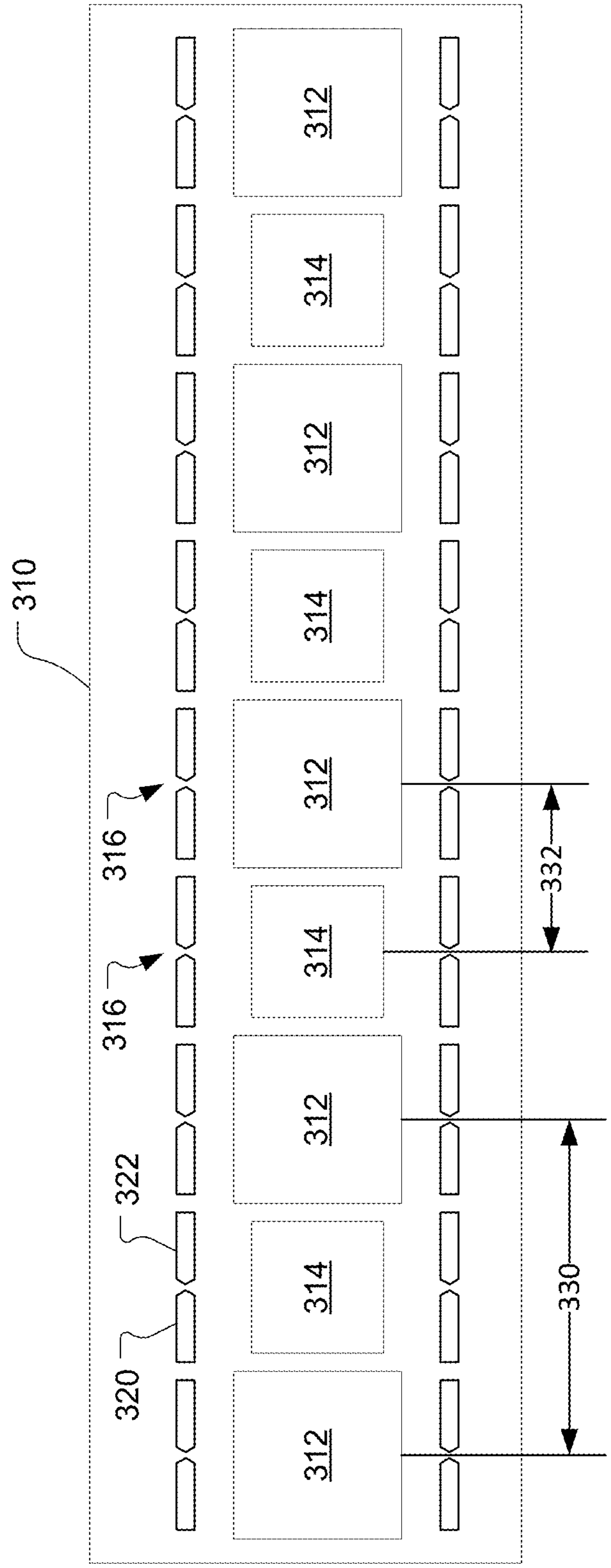
FIG. 10 is a simplified top view of an array of antenna systems.

Referring to FIG. 10, with further reference to FIGS. 3-7, an example of the antenna system 62 (or the antenna system 64) includes an array 310 including multi-band antenna cells 312, a first set of higher-frequency-band antenna cells 314, and a second set of higher-frequency band cells 316. Each of the cells 312 may be configured to operate in a lower frequency band (e.g., a 28 GHz band) and a higher frequency band (e.g., a 60 GHz band). For example, each of the cells 312 may be an example of the antenna system 100, e.g., may be configured similarly to the antenna system 150 discussed above. Each of the cells 314, 316 may be an antenna system configured to operate in the higher frequency band. An example of one of the cells 314 is discussed further below with respect to FIG. 11. In the example shown in FIG. 10, each of the cells 316 is a dipole, having conductive arms 320, 322, and configured to operate in a 60 GHz band, although other configurations of antenna type (e.g., other than a dipole) may be used and/or configurations for other frequency bands may be used. Other quantities of cells than that shown may be used. For example, two or more of the cells 312 along with one or more of the cells 314 may be used. As another example, one of the cells 312 and one of the cells 314 may be used. As yet another example, the number of the cells 312 and the number of the cells 314 may differ by more than one, e.g., if one of the cells 312 is used and more than two of the cells 314 is used (e.g., with multiple consecutive ones of the cells 314 being adjacent to each other, i.e., not interlaced with one or more of the cells 312). As yet another example, a portion of an array may have cells 312, 314 interlaced, and another portion with only cells 314 (not interlaced with any cells 312). Still other examples may be used. In further examples, the cells 316 may be omitted from any of the configurations described above.

The cells of the array 310 are disposed to provide improved antenna gain (e.g., compared to a single cell) while inhibiting grating lobes. For example, the cells 312 are interlaced with the cells 314, with the cells 312, 314 alternating along a length of the array 310. The cells 312 may be disposed with a center-to-center spacing 330 of about a half of a free-space wavelength at a frequency in the lower frequency band. Here, with the cells 312 configured for operation in the 28 GHz band and the 60 GHz band, the center-to-center spacing 330 may be about a half of a free-space wavelength at 30 GHz, e.g., about 5 mm. The cells 314 may be disposed with a center-to-center spacing 332 of about a half of a free-space wavelength at a frequency in the higher frequency band relative to each adjacent antenna component or sub-system configured to operate in the same band in which the cells 314 are configured to operate (e.g., a portion of one of the cells 312 or an adjacent cell 314). Here, with the cells 314 configured for operation in the 60 GHz band and a portion of each of the cells 312 configured to operate in the 60 GHz band, the center-to-center spacing 332 may be about a half of a free-space wavelength at 60 GHz, e.g., about 2.5 mm.

Figure 11:
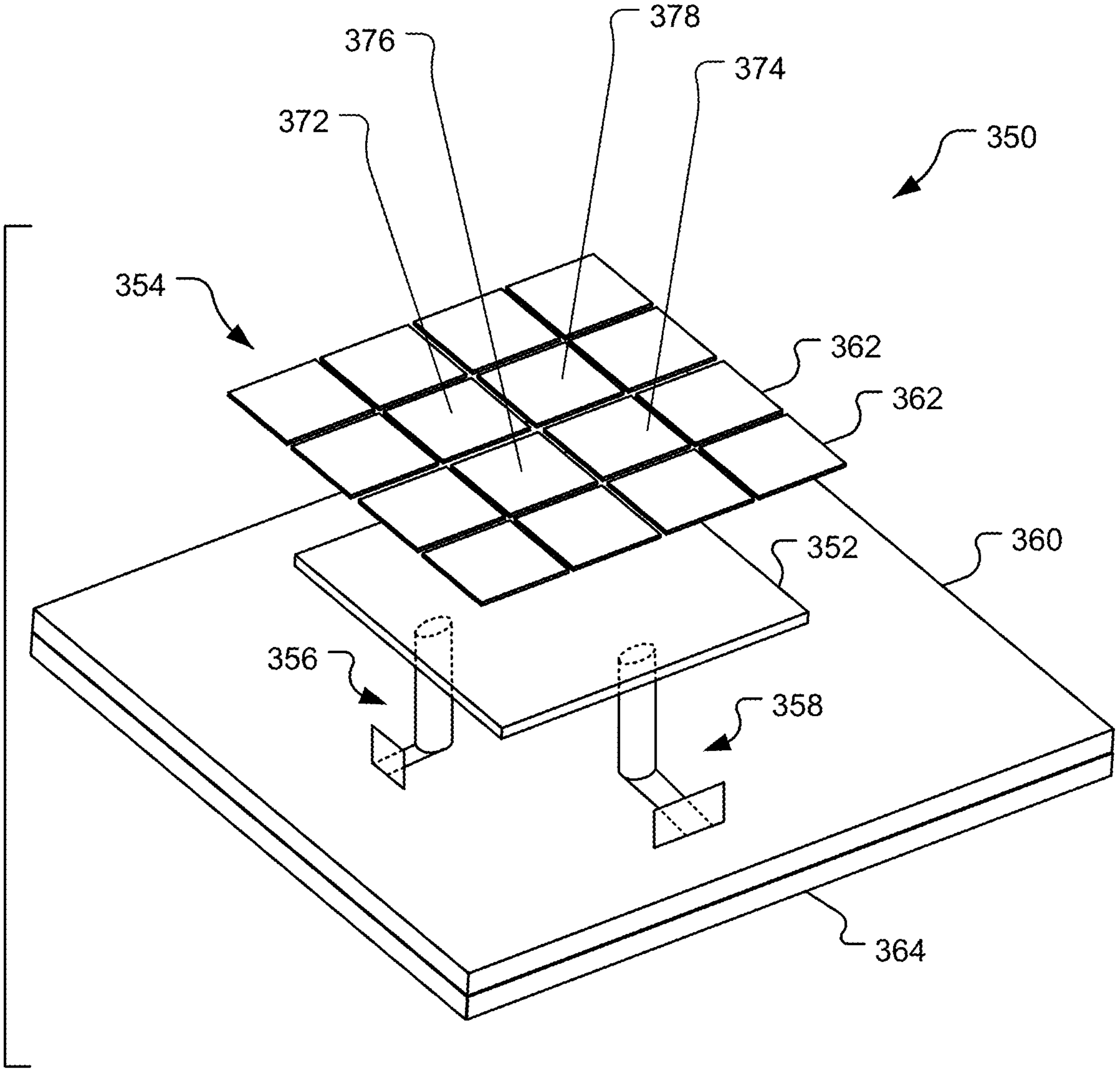
FIG. 11 is a perspective view of an example of one of the antenna systems shown in FIG. 10.

Referring also to FIG. 11, an antenna system 350 is an example of one of the cells 314. The antenna system 350 may be configured to operate over a desired frequency band such as the 60 GHz band. In this example, the antenna system 350 includes stacked patches including a patch antenna element 352 and a patch antenna element 354, and further includes energy couplers 356, 358 and a ground plane 360. The patch antenna element 354 is configured and disposed to operate as a parasitic patch in conjunction with the patch antenna element 352 that is configured and disposed to operate as an active patch. The patch antenna element 354 includes multiple portions 362, which may increase a bandwidth provided by the antenna system 350 compared to the patch antenna element 354 comprising a monolithic conductive piece. The patch antenna element 354 may, however, have other configurations such as being a monolithic conductive sheet, or comprising a different quantity of separate portions rather than the 16 separate portions 362 shown in FIG. 11. In the example shown in FIG. 11, the antenna system 350 includes the two energy couplers 356, 358 that are each configured similarly to the energy coupler 156 shown in FIG. 5, with the energy couplers 356, 358 being directly connected to the patch antenna element 352 for operation of the patch antenna element 352 in orthogonal polarizations. Although the two energy couplers 356, 358 are included in this example, other quantities of energy couplers, such as one energy coupler, may be used. Further, other coupling mechanisms may be employed. Details of the antenna system 350 are omitted from FIG. 11 for the sake of simplicity. For example, a substrate in or on which the patch antenna elements 352, 354 are disposed is not shown, nor are details of a connection layer 364 that is configured and coupled to the energy couplers 356, 358 to convey energy between the energy couplers 356, 358 and front-end circuitry, e.g., the front-end circuit 70 (FIG. 3).

While the antenna system 350 has been described above as an example of one of the cells 314, in other embodiments the antenna system 350 may be configured as an example of one of the cells 312. For example, the patch antenna element 352 may be configured (e.g., sized and shaped) to radiate with a frequency in the range of 20-30 GHz. In some embodiments, the patch antenna element 352 is configured similarly to the patch antenna element 152. Further, the patch antenna element 352 may have an opening or hole (not illustrated in FIG. 11) formed therein to allow multiple feeds (not illustrated in FIG. 11) to couple from the connection layer 364 to several portions 362 of the patch antenna element 354. For example, a first feed may be coupled from the connection layer 364 through an opening in the patch antenna element 352 to a first portion 372 of the portions 362, and a second feed may be coupled from the connection layer 364 through the same opening or a different opening in the patch antenna element 352 to a second portion 374 of the portions 362. In such embodiment, the portions 362 may be smaller than the conductive/antenna element portions (e.g., the antenna element portions 161-164) illustrated in earlier figures, and thus the first and second portions 372, 374 may be configured to radiate at a different (e.g., higher) frequency than the portions illustrated in previous figures. As will be apparent to one of skill in the art, the embodiments illustrated in previous figures are thus not limited to implemented four conductive/antenna element portions. Further, embodiments of antenna systems described herein may include conductive/antenna portions of different shapes and/or sizes. In some embodiments, the portions 372, 374 are sized and/or shaped (e.g., in a square shape) to behave as a full wavelength dipole for signals having a frequency somewhere in the range of about 70 GHz-100 GHz when fed appropriately (e.g., pursuant to methods and configurations described above). In some such embodiments, the portions 376, 378 are sized and shaped (e.g., as a square) the same as the portions 372, 374 and may or may not also be fed so as the cause the portions 376, 378 to behave as a full wavelength dipole. The portions of the patch antenna element 354 other than the portions 372-378 (e.g., those portions forming a perimeter) may be smaller and/or shaped differently than the portions 372-378. For example, the corner portions may be squares of a smaller size and the other portions may be rectangular bars having two sides with a length the same as a side of the portion 372 and a two other sides with a length the same as a side of the corner square portions. This may allow for two of more of the portions 372-378 to be configured for communication in a desired frequency band while also allowing for the overall size and/or shape of the patch antenna element 354 to be configured such that it operates (e.g., parasitically) with the patch antenna element 352 in a second desired frequency band and/or extends the bandwidth in which the patch antenna element 352 can operate.

Operation of Stacked Patches Including Multi-Piece Parasitic Patch

Figure 12:
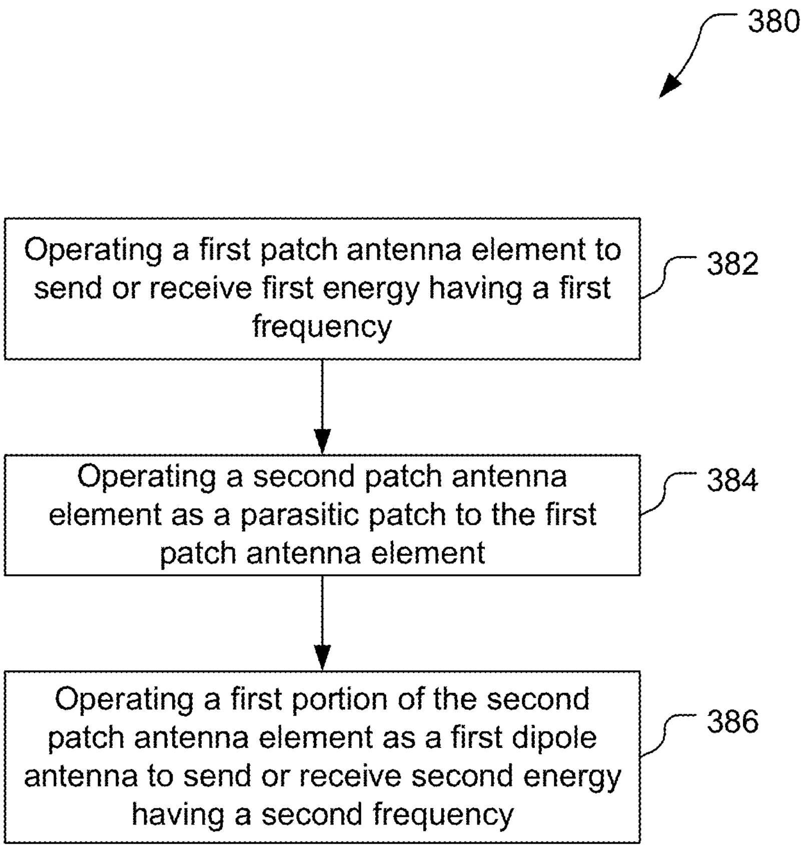
FIG. 12 is a block flow diagram of a method of operating an antenna system.

Referring to FIG. 12, with further reference to FIGS. 1-11, a method 380 of operating an antenna system includes the stages shown. The method 380 is, however, an example only and not limiting. The method 380 may be altered, e.g., by having stages added, removed, rearranged, combined, performed concurrently, and/or having single stages split into multiple stages. Still other alterations to the method 380 as shown and described may be possible.

At stage 382, the method 380 includes operating a first patch antenna element to send or receive first energy having a first frequency. For example, the processor 76 may cause the IF circuit 74 to send signals to the antenna system 62 and/or the antenna system 64 via the front-end circuit 70 and/or the front-end circuit 72, respectively. The front-end circuit(s) 70, 72 may provide signals to the antenna system(s) 62, 64, e.g., to the energy coupler(s) 81, 83, that provide the signals to the antenna element(s) 80, 82. For example, energy in a lower frequency band may be provided to the patch antenna element 152 via the energy coupler 156 (or to multiple instances of the patch antenna element 152 via respective instances of the energy coupler 156 in an array such as the array 310). Also or alternatively, energy may be received by the patch antenna element 152 and provided via the energy coupler 156 (e.g., the energy coupler 81 or the energy coupler 83), the front-end circuit 70 (or 72), and the IF circuit 74 to the processor 76.

At stage 384, the method 380 includes operating a second patch antenna element as a parasitic patch to the first patch antenna element. For example, energy may be provided to the patch antenna element 154 as a parasitic patch due to radiation from the patch antenna element 152, and the patch antenna element 154 may re-radiate some of the energy received by the patch antenna element 154 from the patch antenna element 152. Also or alternatively, the energy may be received by the patch antenna element 154 and some of the received energy coupled (radiated) to the patch antenna element 152 from the patch antenna element 154. The patch antenna elements 152, 154 (and possibly the energy coupler 156) may comprise first means for radiating and/or receiving first energy (e.g., in a lower frequency band). The patch antenna element 154 may comprise parasitic means, for the first means, for parasitically radiating and/or receiving at least a portion of the first energy.

At stage 386, the method 380 includes operating a first portion of the second patch antenna element as a first dipole antenna to send or receive second energy having a second frequency. For example, the processor 76 may cause the IF circuit 74 to send signals to the antenna system 62 and/or the antenna system 64 via the front-end circuit 70 and/or the front-end circuit 72, respectively. The front-end circuit(s) 70, 72 may provide signals to the antenna system(s) 62, 64, e.g., to the energy coupler(s) 81, 83, that provide the signals to the antenna element(s) 80, 82. For example, energy in a higher frequency band may be provided to the patch antenna element 154, and in particular the portions 161, 164, via the energy coupler 158 (or to multiple instances of the patch antenna element 154, and possibly one or more instances of the antenna system 350, via respective instances of the energy coupler 158 or one or more of the energy couplers 356, 358 in an array such as the array 310). Also or alternatively, energy may be received by the patch antenna element 154, e.g., the portions 161, 164, and provided via the energy coupler 158 (e.g., the energy coupler 81 or the energy coupler 83), the front-end circuit 70 (or 72), and the IF circuit 74 to the processor 76. The portions 161, 164 (and/or other portions such as the portions 162, 163) of the patch antenna element 154 (and possibly the energy coupler 158) may provide second means for radiating and/or receiving the second energy in a second frequency band using a subset of pieces of the parasitic means.

The method 380 may include one or more other features, such as one or more of the following features. For example, the method 380 may include operating a second portion of the second patch antenna element as a second dipole antenna to send or receive third energy having the second frequency. In this case, for example, the portions 162, 163, along with a corresponding energy coupler, may also be used to radiate and/or receive energy of the second frequency, e.g., in the second frequency band. Third means for radiating and/or receiving third energy may comprise the portions 162, 163 and the corresponding energy coupler, with the third energy having the second frequency (e.g., having a frequency in the second frequency band). Operating the first dipole antenna and operating the second dipole antenna may comprise radiating (and/or receiving) the second energy and the third energy from the first dipole antenna and the second dipole antenna, respectively, with orthogonal polarizations. For example, two sets of energy couplers (e.g., including the energy coupler 158) may be used to excite the portions 161, 164 (disposed in diagonally opposite quadrants) in one polarization and the portions 162, 163 (disposed in the other diagonally opposite quadrants) in another, orthogonal polarization. Operating the first and second dipoles may comprise differentially feeding the first and second dipoles relative to each other. For example, the conductors 202, 204 feeding the portions 161, 164 may be fed differentially (e.g., 180° out of phase) with respect to conductors feeding the portions 162, 163. Differentially feeding the first and second dipoles may comprise feeding the dipoles through an opening defined in the first patch antenna element with respective pairs of conductive lines. For example, the conductors 202, 204 feeding the portions 161, 164 and the conductors feeding the portions 162, 163 may pass through the opening 190 in the first patch antenna 152. The second frequency (of signals sent and/or received by the first portion of the second patch antenna) may be about twice the first frequency (of signals sent and/or received by the first patch antenna and the second patch antenna).

Other Configurations

The examples discussed above are non-exhaustive examples and numerous other configurations may be used. The discussion below is directed to some of such other configurations, but is not exhaustive (by itself or when combined with the discussion above).

Example Antenna System—Stacked Patches Including Parasitic Patch with Slot(s)/Dipole(s)

Figure 13:
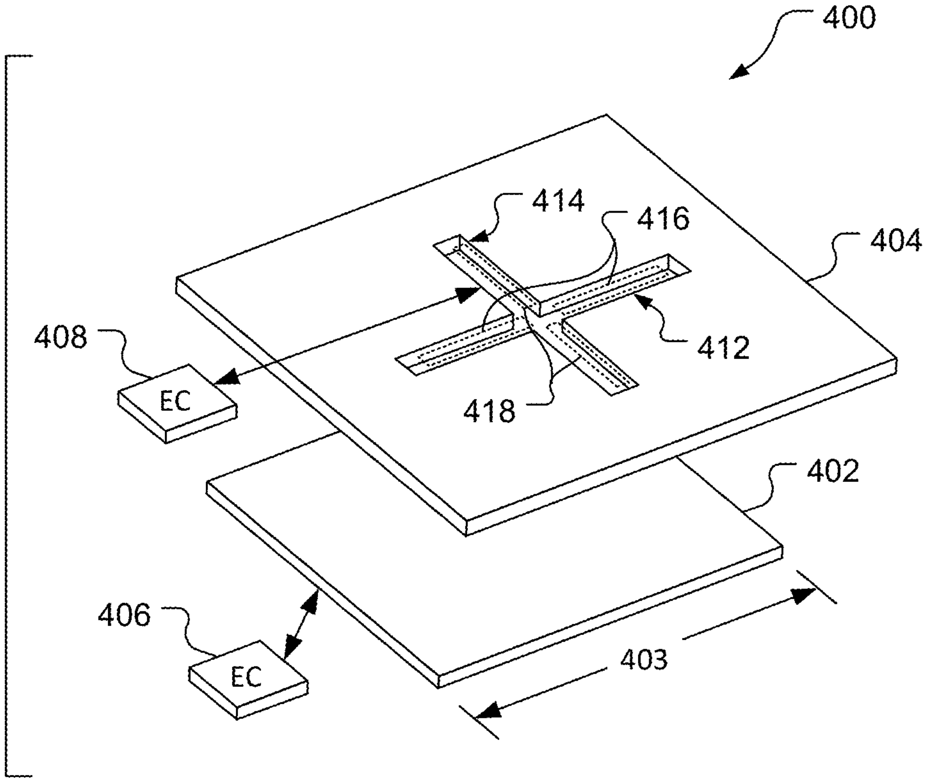
FIG. 13 is a perspective view of another example of an antenna system shown in FIG. 3.

Referring to FIG. 13, with further reference to FIG. 3, an antenna system 400 is an example of the antenna system 62 (or the antenna system 64). The antenna system 400 may have several similarities to the antenna system 100 shown in FIG. 4, but also has significant differences. Also, similar to with FIG. 4, other possible features of the antenna system 400 (e.g., a substrate, a ground plane) are not shown in FIG. 13. The antenna system 400 is a stacked-patch antenna system including patch antenna elements 402, 404, and energy couplers 406, 408. The antenna system 400 may be configured to operate over multiple frequency bands, with broadband operation in each band. For example, the antenna system 400 may operate in frequency bands where frequencies in a first band (a higher frequency band) are about twice frequencies in a second band (a lower frequency band). That is, frequencies in the second band are about half frequencies in the first band, such as a 28 GHz band (e.g., from 28 GHz to 44 GHz) and a 60 GHz band (e.g., from 57.5 GHz to 67.5 GHz). Sub-systems of the system 400 for operation in different bands are co-located, e.g., being disposed at the same location, and in examples discussed herein, the sub-systems share one or more components. For example, the patch antenna element 404 (or one or more portions thereof) may be shared between sub-systems for operation at the different frequency bands. The patch antenna element 404 may be configured to provide additional bandwidth for the patch antenna element 402 (e.g., for 5G operation). The patch antenna element 404 may be configured to provide antenna operation in a different frequency band, e.g., a 60 GHz band. For example, the patch antenna element 404 may provide one or more slots 412, 414 for operation in the different frequency band. Optionally, one or more dipoles 416, 418 may overlap, or even be disposed in, the one or more slots 412, 414, respectively, defined by the patch antenna element 404 for operation in the different frequency band. The one or more dipoles 416, 418 may act as one or more portions of the patch antenna element 404 for operation of the frequency band of the patch antenna element 402. For example, the patch antenna elements 402, 404 (including the one or more dipoles 416, 418, if present), in conjunction with the energy coupler 406, may operate as a patch and a parasitic patch in a first frequency band, e.g., the 28 GHz band. The one or more slots 412, 414 and/or the one or more dipoles 416, 418 (if present), in conjunction with the energy coupler 408, may operate in another frequency band, e.g., the 60 GHz frequency band. The patch antenna element 404 is a parasitic patch, being configured to radiate due to energy reactively coupled from another (patch) radiator, and not being electrically connected to, or disposed to be a primary recipient of energy from, an energy coupler (here the energy coupler 406) that is configured to provide energy of a frequency for which the element is a parasitic element.

The patch antenna element 402 and the energy coupler 406 may be configured similarly to the patch antenna element and the energy coupler 106 shown in FIG. 4 and discussed above. For example, the energy coupler 406 may include the energy coupler 156 and, optionally, another instance of the energy coupler 156, shown in FIGS. 5-7 and discussed above. The patch antenna element 402 may be electrically conductive, and sized and shaped for operation over a desired frequency band. For example, the patch antenna element 402 may radiate more than half of the energy provided to the patch antenna element 402 in the desired frequency band, or may have a resonance in the desired frequency band, etc. In this example shown, the patch antenna element 402 is substantially square with sides each of about half of a wavelength (e.g., 40%-60% of the wavelength) of a signal having a frequency in the desired frequency band (e.g., a lower frequency band such as 27.5 GHz to 44 GHz) and traveling in a substrate of the antenna system 400.

The patch antenna element 404 is sized, shaped, and disposed relative to the patch antenna element 402 to serve as a parasitic patch element for the patch antenna element 402. The patch antenna elements 402, 404 may be separated by about 90° in electrical length. The patch antenna element 404 may be shaped (here substantially as a square) similarly to the patch antenna element 402. The patch antenna element 404 may have sides that are longer (e.g., between 5% and 20% longer) than the sides of the patch antenna element 402. The patch antenna element 404 may have a resonant frequency different from a resonant frequency of the patch antenna element 402, which may help increase an overall bandwidth of the combination of the elements 402, 404. For example, the resonant frequency of the patch antenna element 402 may be greater than three times the resonant frequency of the patch antenna element 404. As a parasitic patch element, the patch antenna element 404 may improve the bandwidth of the patch antenna element 402 similar to the discussion above with respect to the patch antenna element 104. Also similar to the discussion above with respect to the patch antenna element 104, the patch antenna element 404 may be configured, disposed, and coupled (e.g., reactively coupled and not directly electrically coupled) relative to the patch antenna element 402 similar to the patch antenna element 104 relative to the patch antenna element 102.

The energy couplers 406, 408 are configured and disposed to provide energy to and/or receive energy from the patch antenna element 402 and the one or more slots 412, 414 or the one or more dipoles 416, 418. The energy coupler 406 may directly or indirectly provide energy to and/or receive energy from the patch antenna element 402, e.g., as discussed above with respect to the energy coupler 106 and the patch antenna element 102. The energy coupler 408 may indirectly provide energy to and/or receive energy from the one or more slots 412, 414 as discussed further below. Alternatively, the energy coupler 408 may couple energy to and/or receive energy from the one or more dipoles 416, 418 as discussed further below, e.g., being directly electrically connected to the one or more dipoles 416, 418.

The one or more slots 412, 414 or the one or more dipoles 416, 418 may be configured to operate at a higher frequency band than a frequency band at which the patch antenna elements 402, 404 are configured to operate. For example, the one or more slots 412, 414 may have lengths of about half of a wavelength in a substrate of the antenna system 400 corresponding to the higher frequency band (e.g., the 60 GHz band) while the patch antenna elements 402, 404 are configured to operate at the lower frequency band (e.g., the 28 GHz band). For example, lengths of the slots 412, 414 may be about half of lengths 403 of sides of the patch antenna element 402. Similarly, lengths of the dipoles 416, 418 may be about half of the lengths 403 of sides of the patch antenna element 402, in which case the slots in which the dipoles 416, 418 reside or overlap may be longer than the dipoles 416, 418. The slots 412, 414 may be bigger if the dipoles 416, 418 are present than if the dipoles 416, 418 are not present (and thus the slots 412, 414 themselves are used for radiating and/or receiving energy).

The antenna system 400 (including examples discussed below) may be used as a component of an antenna array. For example, the antenna system 400 may be substituted for one or more of the cells 312 shown in FIG. 10. The cells 314 may be configured as discussed above, or may be of a different configuration, e.g., of just the patch antenna element 404 of the system 400 with one or more of the slots 412, 414 or with one or more of the slots 412, 414 and one or more of the dipoles 416, 418, or with just a patch or dipole configured to radiate at the higher frequency.

Examples of Stacked Patches Including Parasitic Patch with Slot(s)

Figure 14:
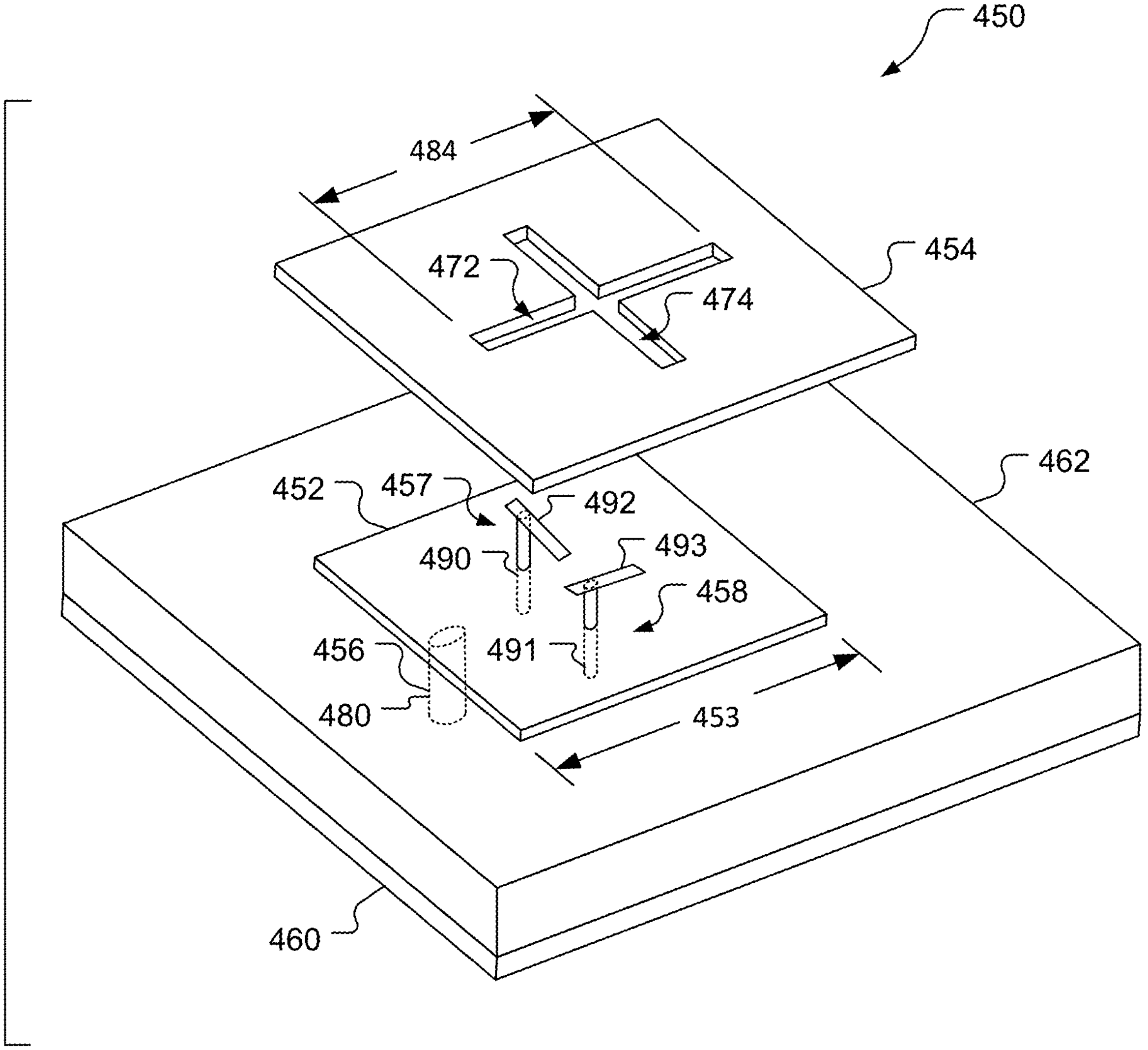
FIG. 14 is a perspective view of an example of the antenna system shown in FIG. 13.

Referring to FIG. 14, with further reference to FIG. 13, an antenna system 450 is an example of the antenna system 400 shown in FIG. 13. The antenna system 450 is a multi-band antenna system that may be configured to operate over a lower frequency band and a higher frequency band. The antenna system 450 may include patch antenna elements 452, 454, energy couplers 456, 457, 458, a ground plane 460, and a substrate 462. The substrate 462 may be a portion (e.g., a layer) of a larger substrate of the antenna system 450, similar to the substrate 170 shown in FIG. 7. Other layers may be used, e.g., a layer between the patch antenna element 452 and coupling strips (discussed below), and a layer between the coupling strips and the patch antenna element 454, with different layers potentially comprising different materials and/or having different dielectric constants. The patch antenna elements 452, 454 are configured to operate in tandem as an active patch antenna element and a parasitic patch antenna element, respectively. The patch antenna element 454 is a multi-purpose element configured to serve at least dual purposes, to operate as both the parasitic patch antenna element for the patch antenna element 452 and to provide one or more slots for operation in a different frequency band than the patch antenna element 452. The patch antenna element 454 may be parasitically coupled to the patch antenna element 452 for operation in one mode (e.g., stacked patch antenna in the lower frequency band) and have slots 472, 474 coupled to the energy couplers 457, 458 for operation in another mode (e.g., for the higher frequency band). For the sake of simplicity of the figure, a substrate that separates the patch antenna element 452 from the patch antenna element 452 is not shown in FIG. 14. A bandwidth of the stacked patch antenna elements 452, 454 may be affected by various characteristics of the antenna system 450, e.g., one or more dielectric constants of one or more layers of a substrate of the antenna system 450, thickness of each layer of substrate, thickness of each of the patch antenna elements 452, 454, etc. A thickness of the antenna system 450, e.g., from the patch antenna element 452 to the ground plane 460 may be about a quarter of a wavelength in the substrate (which may be a combination of different substrate layers) at a desired frequency, e.g., a frequency in the higher frequency band such as 60 GHz. While the patch antenna element 454 defines the two slots 472, 474 as shown, the patch antenna element 454 may define another quantity of slots, e.g., one slot (e.g., for single polarization operation). In another embodiments, several slots that are approximately parallel may be formed in the patch antenna element 454.

The patch antenna elements 452, 454, in conjunction with the ground plane 460 and the energy coupler 456, may comprise a stacked-patch antenna. The patch antenna element 452 is an active patch in that the energy coupler 456 is configured to convey (provide) energy to and/or receive energy from the patch antenna element 452 either by direct connection (e.g., physical conductive connection) or indirect connection (e.g., reactive coupling). Here, the energy coupler 456 includes a conductor 480 that is directly conductively connected to the patch antenna element 452. The patch antenna element 452 comprises a planar conductor disposed on the substrate 462 and configured to radiate and receive energy, possibly in orthogonal polarizations, e.g., if another energy coupler 456 is connected to the patch antenna element 452. In this example, the patch antenna element 452 is rectangular, here substantially square, with side lengths 453 about one-half of a wavelength (e.g., 40%-60% of the wavelength), in the substrate 462, of signals in the lower frequency band, e.g., from 27.5 GHz to 44 GHz. For example, the side lengths 453 may be about one-half of a wavelength (e.g., 40%-60% of the wavelength), in the substrate 462, of a signal having a frequency of about 35 GHz (e.g., between 34.5 GHz and 35.5 GHz). While not shown in this example, the energy coupler 456 may include a tuning stub similar to the tuning stub 182 included in the energy coupler 156 discussed above. The conductor 480 may be coupled to front-end circuitry (e.g., the front-end circuit 70) via a connection layer (not shown), e.g., similar to the connection layer 196 shown in FIGS. 5 and 7. The conductor 480 may comprise plated through vias through the substrate 462.

The patch antenna element 454 defines the slots 472, 474 for operation in the higher frequency band. The slots 472, 474 are centered about a center of the patch antenna element 454 (that is rectangular, here substantially square), and are cross slots, being disposed substantially perpendicularly (orthogonally) relative to each other, with each slot being substantially orthogonal to, and intersecting, the other slot at a midpoint of each of the slots. The slots 472, 474 may be configured, as here, for orthogonal polarization operation (e.g., for circular polarization). The slots 472, 474 may be formed, e.g., by etching of the patch antenna element 454, that may be a metal (e.g., copper) layer on the substrate of the antenna system 450. The slots 472, 474 are sized and shaped for operation (e.g., radiating and/or receiving) energy in the higher frequency band. For example, the slots 472, 474 may have lengths 484 that are similar to each other and that are about one-half (e.g., 45%-55%) of a wavelength at a frequency in the higher frequency band in the substrate of the antenna system 450 (e.g., about half a wavelength at 60 GHz in the substrate). For example, each of the lengths 484 may be about half (e.g., 45%-55%) of the lengths 453 of the sides of the patch antenna element 452 (i.e., the length 453 may be about twice (190%-210%) of the length 484 of the slots 472, 474). In other embodiments, the lengths of the slots 472, 474 may differ from each other such that one slot is configured to radiate at a first higher frequency and the other slot is configured to radiate at a second higher frequency.

The energy couplers 457, 458 (which may be an example of the energy coupler 408 in FIG. 13) may be configured and disposed to couple energy to and/or from (e.g., convey to and/or receive from) the slots 472, 474. The energy couplers 457, 458 include conductors 490, 491 and conductive coupling lines 492, 493, respectively. The coupling lines 492, 493 are disposed between the patch antenna element 452 and the patch antenna element 454. The coupling lines 492, 493 may be conductive strips such as microstrips, and may be disposed to overlap the slots 472, 474 partially, e.g., being transverse to the slots 472, 474 at a sufficient angle and near enough to electromagnetically couple energy to and/or from the slots 472, 474. Here, the coupling lines 492, 493 are disposed substantially perpendicularly (e.g., 85°-95° relative) to the slots 472, 474, respectively. For example, the coupling line 492 may be formed so as to be approximately parallel to the slot 474 and positioned such that it crosses the slot 472 at approximately the location which the numeral 472 is pointing to in FIG. 14, and the coupling line 493 may be formed so as to be approximately parallel to the slot 472 and positioned such that it crosses the slot 474 at approximately the location which the numeral 474 is pointing to in FIG. 14 The conductors 490, 491 may comprise plated through vias through the substrate (not shown) between the coupling lines 492, 493 and the patch antenna element 452, and in the substrate 462. The conductors 490, 491 may pass through the patch antenna element 452 along a null plane for electric field of the patch antenna element 452. The conductors 490, 491 may pass through an opening (not shown) defined by the patch antenna element 452 (e.g., similar to the opening 190 defined by the patch antenna element 152 shown in FIG. 5). The conductors 490, 491 may be separated from the patch antenna element 452, e.g., by an insulator such as some of the substrate of the antenna system 450, or by shielding disposed about the conductors 490, 491, or other means.

Examples of Stacked Patches Including Parasitic Patch with Dipole(s) in Slot(s)

Figure 15:
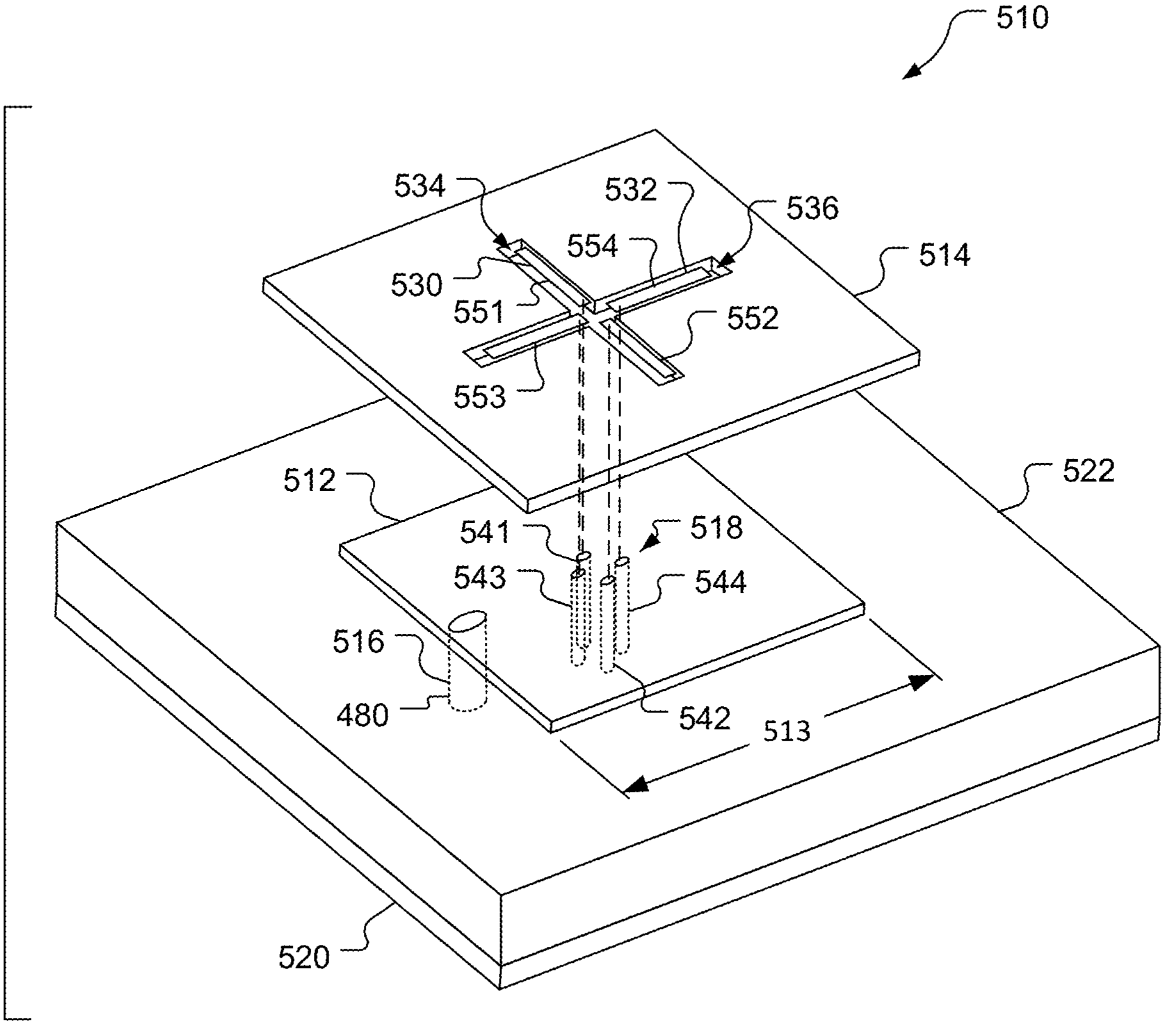
FIG. 15 is a perspective view of another example of the antenna system shown in FIG. 13.

Referring to FIG. 15, with further reference to FIGS. 13 and 14, an antenna system 510 is an example of the antenna system 400 shown in FIG. 13. The antenna system 510 is a multi-band antenna system that may be configured to operate over a lower frequency band and a higher frequency band. The antenna system 510 may include patch antenna elements 512, 514, energy couplers 516, 518, a ground plane 520, and a substrate 522. As with FIG. 14, a substrate between the patch antenna element 512 and the patch antenna element 514 is not shown in order to simplify the figure. The substrate may be configured such that the patch antenna element 514 may be separated from the ground plane 520 by about a quarter of a wavelength in the substrate at a frequency of the higher frequency band (e.g., about 60 GHz). A length 513 of each side of the patch antenna element 512 may be about a half of a wavelength in the substrate at a frequency in the lower frequency band (e.g., about 28 GHz in some embodiments, about 35 GHz in some embodiments, or at other frequencies in other embodiments). Further, as with FIG. 14, connections from the energy couplers 516, 518 (e.g., for connection to front-end circuitry) are not shown in order to simplify the figure.

The antenna system 510 is similar to the antenna system 450 shown in FIG. 14, but with dipoles 530, 532 disposed in slots 534, 536 defined by the patch antenna element 514. Thus, the dipoles 530, 532 may be surrounded by the patch antenna element 514. The patch antenna elements 512, 514, in conjunction with the ground plane 520 and the energy coupler 516, may comprise a stacked-patch antenna. The patch antenna element 512 may be an active patch and the patch antenna element 514 may be a parasitic patch. The slots 534, 536 may be larger (e.g., longer and possibly wider) than the slots 472, 474 of the antenna system 450 in order to work with (e.g., receive) the dipoles 530, 532. Lengths of the dipoles 530, 532 may each be about a half of a wavelength at a frequency in the higher frequency band in the substrate of the antenna system 510. The length 513 of a side of the patch antenna element 512 may thus be about twice (e.g., 190%-210%) the length of each of the dipoles 530, 532. The dipoles 530, 532 at least partially overlap the slots 534, 536 and may be disposed in (received by) the slots 534, 536. The slots 534, 536 may be larger than the dipoles 530, 532, e.g., to receive the dipoles 530, 532 with the dipoles 530, 532 being displaced from walls of the slots 534, 536. For example, widths of the slots 534, 536 may be about three times widths of arms of the dipoles 530, 532, e.g., to inhibit coupling between the dipoles 530, 532 and the patch antenna element 514. The dipole 530 includes dipole arms 551, 552 and the dipole 532 includes dipole arms 553, 554. The dipole arms 551-554 may be conductive strips, and may be formed in a same layer of a substrate (and thus in a same plane) as the patch antenna element 514. While the antenna system 510 is shown with the patch antenna element 514 defining the two slots 534, 536 and including the two dipoles 530, 532, other quantities of slots and dipoles may be used, e.g., one slot and one dipole. Further, while the dipoles 530, 532 are described herein as being disposed in the slots 534, 536, the dipoles 530, 532 may be displaced from a plane of the patch antenna element 514 in some embodiments.

The energy coupler 516 may be similar to the energy coupler 456 and is configured to convey energy to and/or receive energy from the patch antenna element 512. The energy coupler 516 may further include a tuning stub (not shown). Further, the antenna system 510 may include more than one energy coupler 516, e.g., to operate the patch antenna element 512 with orthogonal polarizations.

The energy coupler 518 (which may be an example of the energy coupler 408 in FIG. 13) may be configured and disposed to couple energy to and/or from the dipoles 530, 532. The energy coupler 518 includes conductors 541, 542, 543, 544, with the conductors 541, 542 connected to the dipole arms 551, 552 of the dipole 530, and the conductors 543, 544 connected to the dipole arms 553, 554 of the dipole 532, with these connections indicated by dashed lines in FIG. 15 to help simplify the figure. Other quantities of conductors may be used in the energy coupler 518, e.g., two conductors if only one dipole is included in the antenna system 510. The conductors 541-544 may be plated through vias through the substrate (layers) to connection circuitry (not shown), such as balanced microstrip lines, for connection to further components, e.g., front-end circuitry. The conductors 541-544 may pass through the patch antenna element 512 near null planes of the electric field of the patch antenna element 512, e.g., to inhibit distortion of the electric field of the patch antenna element 512 due to the presence of the conductors 541-544. The conductors 541-544 may pass through an opening (not shown) defined by the patch antenna element 512 (e.g., similar to the opening 190 defined by the patch antenna element 152 shown in FIG. 5).

Operation of Stacked Patches Including Parasitic Patch with Slot(s)/Dipole(s)

Figure 16:
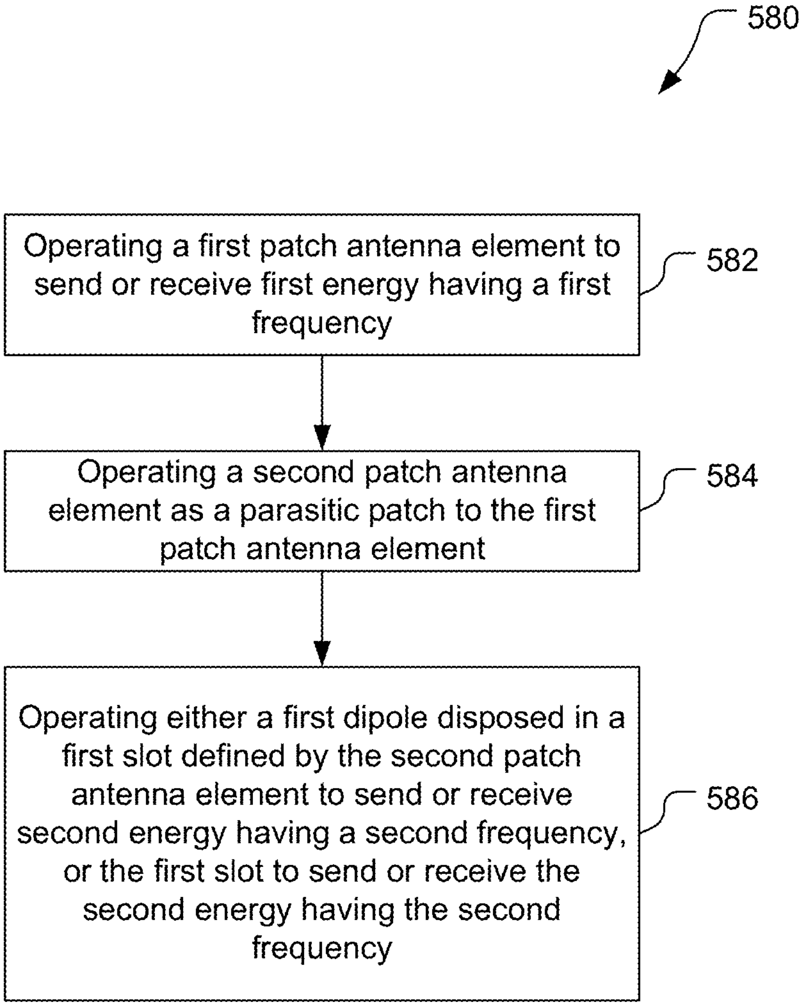
FIG. 16 is a block flow diagram of another method of operating an antenna system.

Referring to FIG. 16, with further reference to FIGS. 3, 10, and 13-15, a method 580 of operating an antenna system includes the stages shown. The method 580 is, however, an example only and not limiting. The method 580 may be altered, e.g., by having stages added, removed, rearranged, combined, performed concurrently, and/or having single stages split into multiple stages. Still other alterations to the method 580 as shown and described may be possible.

At stage 582, the method 580 includes operating a first patch antenna element to send or receive first energy having a first frequency. For example, the processor 76 may cause the IF circuit 74 to send signals to the antenna system 62 and/or the antenna system 64 via the front-end circuit 70 and/or the front-end circuit 72, respectively. The front-end circuit(s) 70, 72 may provide signals to the antenna system(s) 62, 64, e.g., to the energy coupler(s) 81, 83, that provide the signals to the antenna element(s) 80, 82. For example, energy in a lower frequency band may be provided to the patch antenna element 452, 512 via the energy coupler 456, 516, respectively (or to multiple instances of the patch antenna element 452, 512 via respective instances of the energy coupler 456, 516 in an array such as the array 310). Also or alternatively, energy may be received by the patch antenna element 452, 512 and provided via the energy coupler 456, 516 (e.g., the energy coupler 81 or the energy coupler 83), the front-end circuit 70 (or 72), and the IF circuit 74 to the processor 76.

At stage 584, the method 580 includes operating a second patch antenna element as a parasitic patch to the first patch antenna element. For example, energy may be provided to the patch antenna element 454, 514 as a parasitic patch due to radiation from the patch antenna element 452, 512, and the patch antenna element 454, 514 may re-radiate some of the energy received by the patch antenna element 454, 514 from the patch antenna element 452, 512. Also or alternatively, the energy may be received by the patch antenna element 454, 514 and some of the received energy coupled (re-radiated) to the patch antenna element 452, 512 from the patch antenna element 454, 514. The patch antenna elements 452, 454 or 512, 514 may comprise first means for radiating and/or receiving first energy (e.g., in a lower frequency band). The patch antenna element 454 may comprise parasitic means, for the first means, for parasitically radiating and/or receiving at least a portion of the first energy.

At stage 586, the method 580 includes operating either a first dipole disposed in a first slot defined by the second patch antenna element to send or receive second energy having a second frequency, or the first slot to send or receive the second energy having the second frequency. For example, the processor 76 may cause the IF circuit 74 to send signals to the antenna system 62 and/or the antenna system 64 via the front-end circuit 70 and/or the front-end circuit 72, respectively. The front-end circuit(s) 70, 72 may provide signals to the antenna system(s) 62, 64, e.g., to the energy coupler(s) 81, 83, that provide the signals to the antenna element(s) 80, 82. For example, energy in a higher frequency band may be provided to the patch antenna element 454, and in particular the slot 472, via the energy coupler 457, e.g., the conductor 490 and the coupling strip 492. Energy in the higher frequency band may be provided to multiple slots, e.g., the slots 472, 474 via the energy couplers 457, 458. Also or alternatively, energy may be provided to multiple instances of the patch antenna element 454, and possibly one or more instances of the antenna system 450, via respective instances of the energy coupler 457, or one or more of the energy couplers 457, 458 (or other configuration of the antenna system 450) in an array such as the array 310. Also or alternatively, energy may be received by the patch antenna element 454, e.g., one or both of the slots 472, 474, and provided via the energy coupler(s) 457, 458 (e.g., the energy coupler 81 or the energy coupler 83), the front-end circuit 70 (or 72), and the IF circuit 74 to the processor 76. The slot 472 (and/or the slot 474) of the patch antenna element 454 may provide at least part of second means for radiating and/or receiving the second energy in a second frequency band using a subset of pieces of the parasitic means. The energy coupler(s) 457, 458 may provide one or more further portions of the second means for radiating and/or receiving the second energy.

As another example of stage 586, energy in the higher frequency band may be provided to the dipole 530, via the energy coupler 518, e.g., the conductors 541, 542. Energy in the higher frequency band may be provided to multiple dipoles, e.g., the dipoles 530, 532 via the energy coupler 518 (using the conductors 541-544). Also or alternatively, energy may be provided to one or more instances of the antenna system 510, via respective instances of the energy coupler 518, or two or more of the conductors 541-544 (or other configuration of the antenna system 510) in an array such as the array 310. Also or alternatively, energy may be received by one or both of the dipoles 530, 532, and provided via the energy coupler 518 (e.g., the energy coupler 81 or the energy coupler 83), the front-end circuit 70 (or 72), and the IF circuit 74 to the processor 76. The dipole 530 (and/or the dipole 532) of the patch antenna element 514 may provide at least part of second means for radiating and/or receiving the second energy in a second frequency band, and one or more of the dipole arms 551-554 may provide conducting means. The energy coupler 518 may provide one or more further portions of the second means for radiating and/or receiving the second energy.

The method 580 may include one or more other features, such as one or more of the following features. For example, the method 580 may include operating multiple slots or multiple dipoles for orthogonal polarization of the higher frequency band energy. The second frequency may be about twice the first frequency. Still other features may be implemented.

As described, operation of a stacked patch antenna and a dipole may enable use of an aperture for communications at multiple frequencies. Further, the aperture may be utilized for communications of orthogonal polarizations at each of the multiple frequencies.

Other Considerations

The techniques and discussed above are examples, and not exhaustive. Configurations other than those discussed may be used.

As used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The invention claimed is:

1. An antenna system comprising:

a first patch antenna element that is electrically conductive;

a first energy coupler configured to convey first energy to, or receive the first energy from, the first patch antenna element, the first energy being in a first frequency band;

a second patch antenna element at least partially overlapping the first patch antenna element, the second patch antenna element comprising a plurality of physically separate portions that are each electrically conductive; and a second energy coupler connected to a first subset of the plurality of physically separate portions, the first subset comprising less than all of the plurality of physically separate portions, the second energy coupler configured to convey second energy to, or receive the second energy from, the first subset, the second energy being in a second frequency band that is higher than the first frequency band, wherein the second patch antenna element has side lengths that are longer than side lengths of the first patch antenna element.

2. The antenna system of claim 1, wherein the second energy coupler is connected to the first subset to operate the first subset as a first dipole, and wherein the first dipole comprises a first plurality of conductive patches.

3. The antenna system of claim 1, wherein the first patch antenna element has a first perimeter with a first perimeter shape, and the second patch antenna element has a second perimeter bounding the second patch antenna element, the second perimeter having the first perimeter shape.

4. The antenna system of claim 3, wherein the first perimeter is substantially square, the second perimeter is substantially square, and each of the plurality of physically separate portions is substantially square, and wherein a first side of the first patch antenna element has a first side length that is approximately half of a wavelength in a substrate of the antenna system at a first frequency in the first frequency band and a second side of each of the plurality of physically separate portions has a second side length that is at least approximately half of a wavelength in the substrate of the antenna system at a second frequency in the second frequency band.

5. The antenna system of claim 4, wherein each of the plurality of physically separate portions is disposed in a respective quadrant within the second perimeter, the first subset comprising two of the plurality of physically separate portions disposed in diagonally disposed quadrants.

6. The antenna system of claim 5, wherein the first side length is approximately twice the second side length of each of the plurality of physically separate portions, and the second side length is approximately a half of the wavelength at the second frequency.

7. The antenna system of claim 1, further comprising a third energy coupler either:

coupled to the first patch antenna element to operate the first patch antenna element, in conjunction with the first energy coupler, as an orthogonally-polarized patch antenna element; or connected to a second subset of the plurality of physically separate portions of the second patch antenna element to convey the second energy to, or receive the second energy from, the second subset, the second subset being distinct from the first subset.

8. The antenna system of claim 7, wherein the third energy coupler is coupled to the second subset, the first subset comprising two kitty-corner portions of the plurality of physically separate portions of the second patch antenna element, and the second subset comprising two other kitty-corner portions of the plurality of physically separate portions of the second patch antenna element.

9. The antenna system of claim 1, wherein the first patch antenna element defines an opening through which at least a portion of the second energy coupler passes, the second energy coupler being displaced from the first patch antenna element.

10. The antenna system of claim 9, wherein the opening is symmetric about a center of the first patch antenna element.

11. The antenna system of claim 1, wherein the first patch antenna element and the second patch antenna element comprise a first cell, the antenna system further comprising a second cell configured similarly to the first cell and displaced from the first cell, parallel to a plane of the first patch antenna element, approximately one half of a free-space wavelength of a frequency of the first energy.

12. The antenna system of claim 1, further comprising at least one first tuner disposed between the first patch antenna element and the second patch antenna element.

13. The antenna system of claim 12, wherein the at least one first tuner comprises a plurality of conductive strips coupled to the second energy coupler.

14. The antenna system of claim 13, wherein the plurality of conductive strips are disposed in different layers of the antenna system.

15. The antenna system of claim 1, further comprising a plurality of second tuners each coupled to a respective one of the first energy coupler and the second energy coupler.

16. The antenna system of claim 15, wherein each of the plurality of second tuners comprises a conductive stub.

17. He antenna system of claim 1, wherein a combination of the first patch antenna element, the second patch antenna element, the first energy coupler, and the second energy coupler comprises a first array cell, the antenna system comprising an array comprising a plurality of the first array cells and a plurality of second array cells, each of the plurality of second array cells being configured to operate in the second frequency band, the plurality of the first array cells being interlaced with the plurality of second array cells in the array.

18. The antenna system of claim 1, wherein the second patch antenna comprises more than four physically separate portions.

19. The antenna system of claim 1, wherein the a resonant frequency of the first patch antenna element is different from a resonant frequency of a combination of the first patch antenna element and the second patch antenna element.

20. The antenna system of claim 19, wherein the resonant frequency of the first patch antenna element is higher than the resonant frequency of the combination of the first patch antenna element and the second patch antenna element.

21. The antenna system of claim 1, wherein the first patch antenna element is configured to radiate at a first frequency in the first frequency band, and wherein the first patch antenna element and the second patch antenna element are configured to radiate in combination at a second frequency in the first frequency band, the second frequency being lower than the first frequency.

22. The antenna system of claim 1, wherein the second patch antenna element is configured to operate as a parasitic patch to the first patch antenna element.

23. The antenna system of claim 1, wherein the second patch antenna element is configured to improve a bandwidth of the first patch antenna element.

24. The antenna system of claim 1, wherein the second patch antenna element is configured to extend a bandwidth of the first patch antenna element to a lower frequency.

25. The antenna system of claim 1, wherein a projection of the first patch antenna element orthogonal to a plane of the first patch antenna element is wholly within a perimeter of the second patch antenna element.

26. A method of operating an antenna system, the method comprising:

conveying first energy to, or receiving the first energy from, a first patch antenna element that is electrically conductive, the first energy being in a first frequency band;

conveying second energy to, or receiving the second energy from, a first subset of a plurality of physically separate portions that are each electrically conductive, the plurality of physically separate portions included in a second patch antenna element at least partially overlapping the first patch antenna element, the second energy being in a second frequency band that is higher than the first frequency band, wherein the second patch antenna element has side lengths that are longer than side lengths of the first patch antenna element.

* * * * *